United States Patent
Noda

(10) Patent No.: US 10,697,748 B2
(45) Date of Patent: Jun. 30, 2020

(54) METHOD FOR CONTROLLING SHAPE MEASURING APPARATUS

(71) Applicant: MITUTOYO CORPORATION, Kanagawa (JP)

(72) Inventor: Takashi Noda, Tochigi (JP)

(73) Assignee: MITUTOYO CORPORATION, Kanagawa (JP)

(*) Notice: Subject to any disclaimer, the term of this patent is extended or adjusted under 35 U.S.C. 154(b) by 233 days.

(21) Appl. No.: 15/873,178

(22) Filed: Jan. 17, 2018

(65) Prior Publication Data
US 2018/0216924 A1  Aug. 2, 2018

(30) Foreign Application Priority Data
Jan. 30, 2017 (JP) ................. 2017-014609

(51) Int. Cl.
| | | |
|---|---|---|
| G01B 5/008 | (2006.01) | |
| G01B 5/016 | (2006.01) | |
| G01B 5/012 | (2006.01) | |
| G01B 5/20 | (2006.01) | |
| G01B 21/04 | (2006.01) | |

(52) U.S. Cl.
CPC ............ *G01B 5/016* (2013.01); *G01B 5/008* (2013.01); *G01B 5/012* (2013.01); *G01B 5/20* (2013.01); *G01B 21/047* (2013.01); *G01B 21/045* (2013.01)

(58) Field of Classification Search
CPC .................................................. G01B 5/008
USPC ......................................................... 33/503
See application file for complete search history.

(56) References Cited

U.S. PATENT DOCUMENTS

| | | | | |
|---|---|---|---|---|
| 5,006,999 A * | 4/1991 | Kuno | ................... | G05B 19/425 |
| | | | | 219/124.34 |
| 6,546,643 B2 * | 4/2003 | Lotze | ................... | G01B 21/045 |
| | | | | 33/503 |
| 2009/0025463 A1 * | 1/2009 | McFarland | .......... | G01B 21/045 |
| | | | | 73/104 |

(Continued)

FOREIGN PATENT DOCUMENTS

| | | |
|---|---|---|
| JP | 2873404 | 3/1999 |
| JP | 2013-160765 | 8/2013 |
| WO | 90-07097 | 6/1990 |

OTHER PUBLICATIONS

Office Action issued in Japan Counterpart Patent Appl. No. 2017-014609, dated Apr. 21, 2017, along with an english translation thereof.

*Primary Examiner* — Christopher W Fulton
(74) *Attorney, Agent, or Firm* — Greenblum & Bernstein, P.L.C.

(57) ABSTRACT

A shape measuring apparatus includes a probe head that changes its posture by rotational motion of a first drive axis and a second drive axis, and a coordinate measuring machine that three-dimensionally displaces a location of the probe head by three translation axes (a third drive axis, a fourth drive axis, and a fifth drive axis). The location of a measurement tip is given by coordinate values of the third to fifth drive axes, and the posture of a probe head is given by a first rotating angle $\alpha$ and a second rotating angle $\beta$. An intersection point between a first rotation axis and a second rotation axis is set as a rotation center Q. An interpolation point in each control period is calculated for each of the first to fifth drive axes.

12 Claims, 18 Drawing Sheets

(56) References Cited

U.S. PATENT DOCUMENTS

| | | | |
|---|---|---|---|
| 2011/0192042 A1 | 8/2011 | McMurtry et al. | |
| 2014/0156052 A1* | 6/2014 | Nishibashi | G05B 19/4103 |
| | | | 700/112 |
| 2014/0172153 A1* | 6/2014 | Nishibashi | G05B 19/4103 |
| | | | 700/192 |
| 2015/0205284 A1* | 7/2015 | Fujino | G05B 19/19 |
| | | | 700/187 |
| 2015/0362305 A1* | 12/2015 | Ferrari | G01N 29/225 |
| | | | 33/503 |

* cited by examiner

METHOD FOR CONTROLLING SHAPE MEASURING APPARATUS

INCORPORATION BY REFERENCE

This application is based upon and claims the benefit of priority from Japanese patent application No. 2017-014609, filed on Jan. 30, 2017, the disclosure of which are incorporated herein in its entirety by reference.

BACKGROUND OF THE INVENTION

1. Field of the Invention

The present invention relates to a method for controlling a shape measuring apparatus.

2. Description of Related Art

Shape measuring apparatuses that detect a surface of an object to be measured with a probe have been widely used. The probe is attached to a coordinate measuring machine so as to be able to move three-dimensionally. Alternatively, there is also a movable probe head that includes a rotation axis in the probe itself.
(Hereinafter, a movable probe head is simply referred to as a probe head in this description.)
FIG. 1 shows an example of a probe head 500 (JP 2873404 B).
As shown in FIG. 1, the probe head 500 includes a head fixing part 501 and a stylus 502 having a measurement tip 503 at the tip.
The probe head 500 is attached to a coordinate measuring machine 200 by the head fixing part 501.
Between the head fixing part 501 and the stylus 502, two rotation mechanisms 510 and 520 are provided. The two rotation mechanisms are a first rotation mechanism part 510 having a first rotation axis A1 as the rotation axis and a second rotation mechanism part 520 having a second rotation axis A2 perpendicular to the first rotation axis A1 as the rotation axis.
Thus, the measurement tip 503 is capable of moving by five drive axes in total, that is, three drive axes (X-axis, Y-axis, and Z-axis) included in the coordinate measuring machine 200, and the two rotation axes A1 and A2 included in the probe head 500.
Since the shape measuring apparatus can control the position of the measurement tip 503 not only by three axes but by five axes, it is possible to measure a complicated shape workpiece at high speed.

SUMMARY OF THE INVENTION

Although a complicated workpiece can be measured at high speed due to the measurement tip 503 capable of moving by the five drive axes, a new problem has arisen.
As an example, we assume a case the measurement tip 503 is moved from a first point to a second point in order for the measurement tip 503 to be moved to the next object portion to be measured (for example, see FIG. 4).
As long as the position of the second point (x, y, z, $\alpha$, $\beta$) that is a target point is provided, the shape measuring apparatus can move the measurement tip 503 to the position.
Here, it is assumed that $\alpha$ indicates the rotating angle of the first rotation mechanism part 510 (a first rotating angle), and that $\beta$ indicates the rotating angle of the second rotation mechanism part 520 (a second rotating angle). That is, the movement of the measurement tip 503 means not only the change in the three-dimensional location (X, Y, Z) but also the change in the posture ($\alpha$, $\beta$) of the probe head 500.
Since the drive axes (X-axis, Y-axis, and Z-axis) of the coordinate measuring machine 200 and the drive axes (the first rotation axis A1 and the second rotation axis A2) of the probe head 500 are provided, each drive axis is optimally controlled under the positioning feedback control for each drive axis.
Then, the measurement tip 503 reaches the target point (the second point). However, although the measurement tip 503 can reach the target point (the second point), how the measurement tip 503 moves during the path is unknown until the measurement is performed.
If the measurement tip 503 swings during the movement more than the operator has expected, the measurement tip 503 (or the stylus 502) can interfere with the workpiece. In that case, the measurement tip 503 (or the stylus 502) and the workpiece are damaged.
The operator is required to pay attention to the probe head 500 during the movement so that the stylus 502 does not interfere with the workpiece. However, since it is difficult to predict the trajectory of the measurement tip 503, the operator has no way other than to predict the trajectory with large leeway, or to check the trajectory by trying several times.
A purpose of the present invention is to provide a method for controlling a shape measuring apparatus capable of controlling five axes so as to be able to predict a movement path of a measurement tip.
A method for controlling a shape measuring apparatus according to an embodiment of the present invention is a method for controlling a shape measuring apparatus, the apparatus comprising;
  a probe head including a stylus having a measurement tip at a tip, a first drive axis that rotates about a first rotation axis and a second drive axis that rotates about a second rotation axis perpendicular to the first rotation axis, the probe head changing a posture of the stylus by rotational motion of the first drive axis and the second drive axis;
  a coordinate measuring machine including three translation axes of a third drive axis, a fourth drive axis, and a fifth drive axis that are perpendicular to each other, the coordinate measuring machine three-dimensionally displacing a location of the probe head;
  wherein a location of the measurement tip being given by coordinate values (T3, T4, T5) of the third to fifth drive axes, and a posture of the probe head being given by a first rotating angle $\alpha$ of the first drive axis and a second rotating angle $\beta$ of the second drive axis,
  the method includes:
  calculating, for each of the first to fifth drive axes, an interpolation point in each control period in a movement path starting from a current position Hs (Ts3, Ts4, Ts5, $\alpha$s, $\beta$s) to a target position He (Te3, Te4, Te5, $\alpha$e, $\beta$e);
  setting an intersection point between the first rotation axis and the second rotation axis as a rotation center Q, and coordinate values of the rotation center Q into which coordinate values of the interpolation point of the measurement tip are converted by a predetermined conversion expression considering values of the interpolation point ($\alpha$i, $\beta$i) of the first drive axis and the second drive axis as a controlling interpolation point Qi; and
  controlling locations of the third to fifth drive axes to the controlling interpolation point Qi in each control period, and locations of the first and second drive axes to the interpolation point (αi, βi) of the first and second drive axes.

In an embodiment of the present invention, it is preferable that speed patterns, of the first to fifth drive axes, each starting from the current position Hs (Ts3, Ts4, Ts5, αs, βs) to the target position He (Te3, Te4, Te5, αe, βe) are generated; and standardized speed patterns of the third to fifth drive axes are generated such that the speed patterns generated for the third to fifth drive axes are synchronized at a common acceleration/deceleration time and in a common necessary time.

In an embodiment of the present invention, it is preferable that speed patterns, of the first to fifth drive axes, each starting from the current position Hs (Ts3, Ts4, Ts5, αs, βs) to the target position He (Te3, Te4, Te5, αe, βe) are generated; and standardized speed patterns of the first to fifth drive axes are generated such that the speed patterns generated for the first to fifth drive axes are synchronized at a common acceleration/deceleration time and in a common necessary time.

A method for controlling a shape measuring apparatus according to an embodiment of the present invention is a method for controlling a shape measuring apparatus, the apparatus comprising;

a probe head including a stylus having a measurement tip at a tip, a first drive axis that rotates about a first rotation axis and a second drive axis that rotates about a second rotation axis perpendicular to the first rotation axis, the probe head changing a posture of the stylus by rotational motion of the first drive axis and the second drive axis;

a coordinate measuring machine including three translation axes of a third drive axis, a fourth drive axis, and a fifth drive axis that are perpendicular to each other, the coordinate measuring machine three-dimensionally displacing a location of the probe head;

wherein a location of the measurement tip being given by coordinate values (T3, T4, T5) of the third to fifth drive axes, and a posture of the probe head being given by a first rotating angle α of the first drive axis and a second rotating angle β of the second drive axis, the method includes:

controlling a movement locus of the measurement tip so as to be a straight line in a movement path starting from a current position Hs (Ts3, Ts4, Ts5, αs, βs) to a target position He (Te3, Te4, Te5, αe, βe).

A method for controlling a shape measuring apparatus according to an embodiment of the present invention is a method for controlling a shape measuring apparatus, the apparatus comprising;

a probe head including a stylus having a measurement tip at a tip, a first drive axis that rotates about a first rotation axis and a second drive axis that rotates about a second rotation axis perpendicular to the first rotation axis, the probe head changing a posture of the stylus by rotational motion of the first drive axis and the second drive axis;

a coordinate measuring machine including three translation axes of a third drive axis, a fourth drive axis, and a fifth drive axis that are perpendicular to each other, the coordinate measuring machine three-dimensionally displacing a location of the probe head;

wherein a location of the measurement tip being given by coordinate values (T3, T4, T5) of the third to fifth drive axes, and a posture of the probe head being given by a first rotating angle α of the first drive axis and a second rotating angle β of the second drive axis, the method includes:

setting, by an operator, a movement path starting from a current position Hs (Ts3, Ts4, Ts5, αs, βs) to a target position He (Te3, Te4, Te5, αe, βe);

calculating, for each of the first to fifth drive axes, an interpolation point in each control period in a movement path starting from a current position Hs (Ts3, Ts4, Ts5, αs, βs) to a target position He (Te3, Te4, Te5, αe, βe);

setting an intersection point between the first rotation axis and the second rotation axis as a rotation center Q, and coordinate values of the rotation center Q into which coordinate values of the interpolation point of the measurement tip are converted by a predetermined conversion expression considering values of the interpolation point (αi, βi) of the first drive axis and the second drive axis as a controlling interpolation point Qi; and controlling locations of the third to fifth drive axes to the controlling interpolation point Qi in each control period, and locations of the first and second drive axes to the interpolation point (αi, βi) of the first and second drive axes.

In an embodiment of the present invention, it is preferable that the movement path starting from the current position Hs (Ts3, Ts4, Ts5, αs, βs) to the target position He (Te3, Te4, Te5, αe, βe) is set as a substantially straight-line movement path.

In an embodiment of the present invention, it is preferable that the movement path starting from the current position Hs (Ts3, Ts4, Ts5, αs, βs) to the target position He (Te3, Te4, Te5, αe, βe) is set as a substantially polygonal curve movement path.

In an embodiment of the present invention, it is preferable that the movement path starting from the current position Hs (Ts3, Ts4, Ts5, αs, βs) to the target position He (Te3, Te4, Te5, αe, βe) is set as a substantially arcuate movement path.

DETAILED DESCRIPTION

Figure 1:
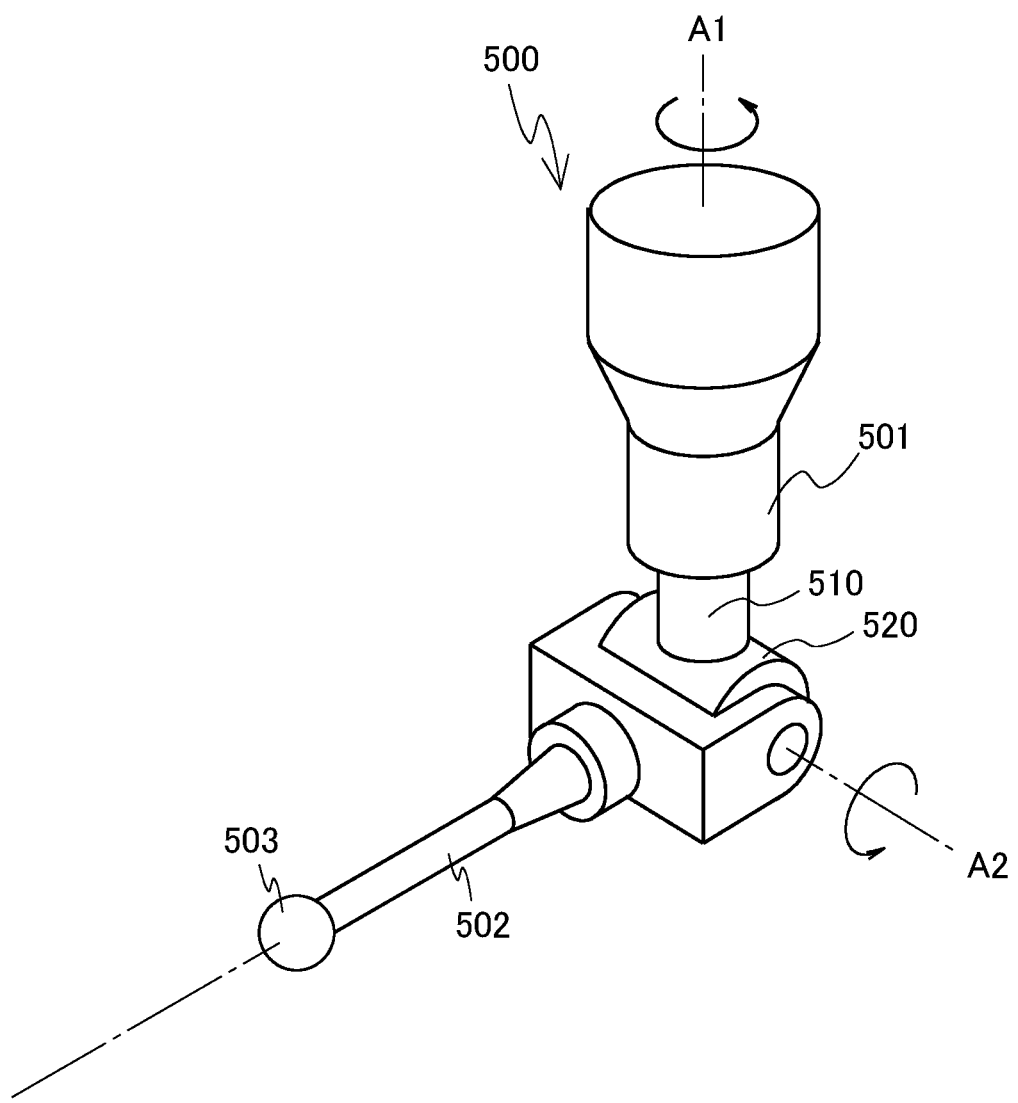
FIG. 1 is a diagram showing an example of a probe head.

An embodiment of the present invention is illustrated and described with reference to reference signs attached to constitution elements in the drawings.

First Exemplary Embodiment

Figure 2:
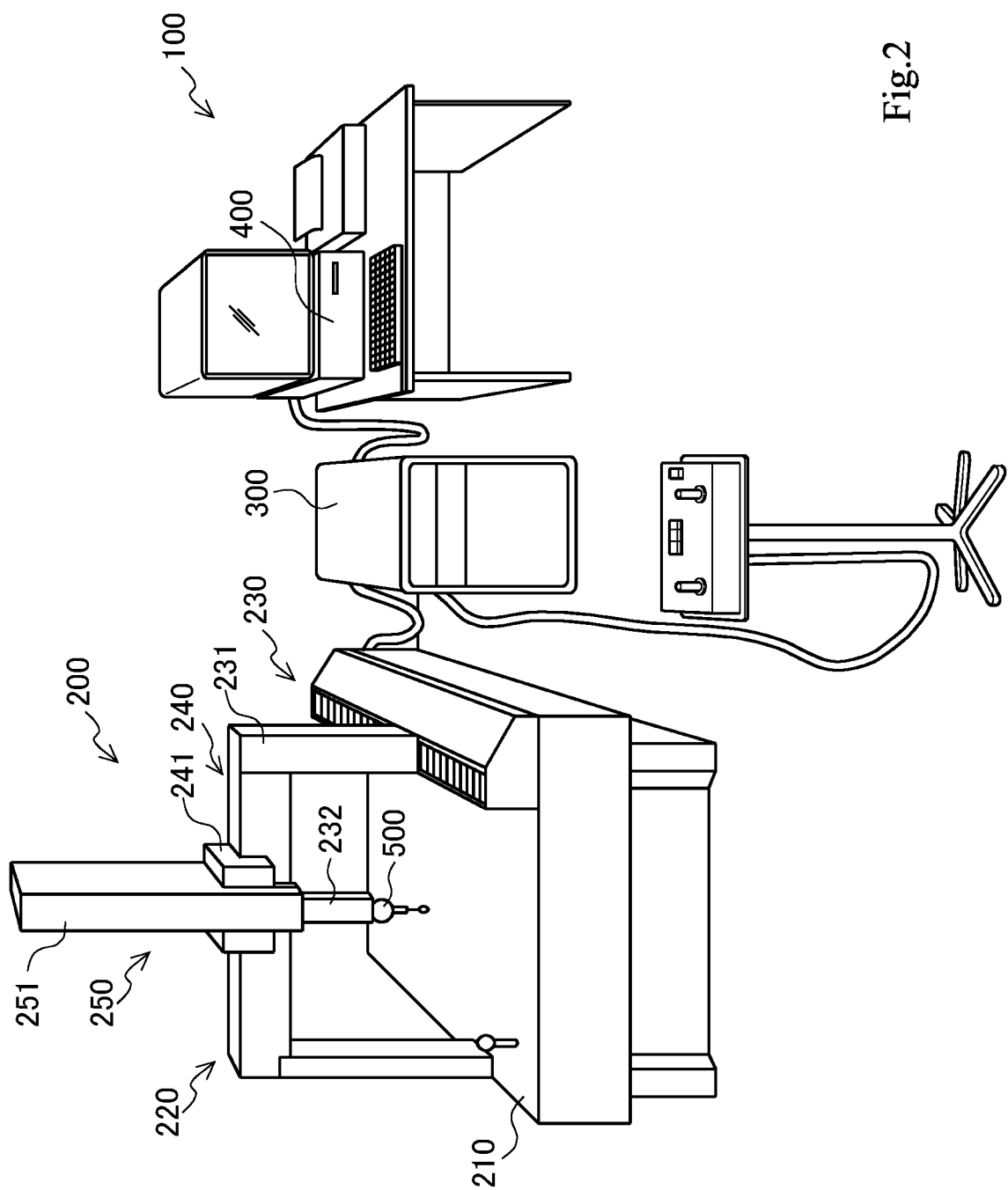
FIG. 2 is a diagram showing a configuration of an entire shape measuring system.

FIG. 2 is a diagram showing a configuration of an entire shape measuring system 100.

The configuration of the shape measuring system 100 is known but briefly described.

The shape measuring system 100 includes a coordinate measuring machine 200, a motion controller 300 that controls drive of the coordinate measuring machine 200, and a host computer 400 that controls the motion controller 300 and performs necessary data processing.

The coordinate measuring machine 200 includes a base 210, a moving mechanism 220, and a probe head 500.

The moving mechanism 220 includes a gate-shaped Y slider 231, an X slider 241, a Z-axis column 251, and a Z spindle 252. The Y slider 231 is provided slidably on the base 210 in the Y direction. The X slider 241 slides along a beam of the Y slider 231 in the X direction. The Z-axis column 251 is secured to the X slider 241. The Z spindle 252 moves up and down inside the Z-axis column 251 in the Z direction.

A driving motor (not shown) and an encoder (not shown) are fixed on each of the Y slider 231, the X slider 241, and the Z spindle 252.

Each driving motor is controlled by drive control signals from the motion controller 300. The encoder detects the displacement of each of the Y slider 231, the X slider 241, and the Z spindle 252, and outputs the detection value to the motion controller 300

The probe head 500 is attached to the lower end of the Z spindle 252.

In the following description, the drive mechanism for driving the Y slider 231 is referred to as a Y-drive axis 230, the drive mechanism for driving the X slider 241 is referred to as an X-drive axis 240, and the drive mechanism for driving the Z spindle 252 is referred to as a Z-drive axis 250.

The drive mechanism referred in the description means, for example, a combination of a ball screw and a motor.

Figure 3:
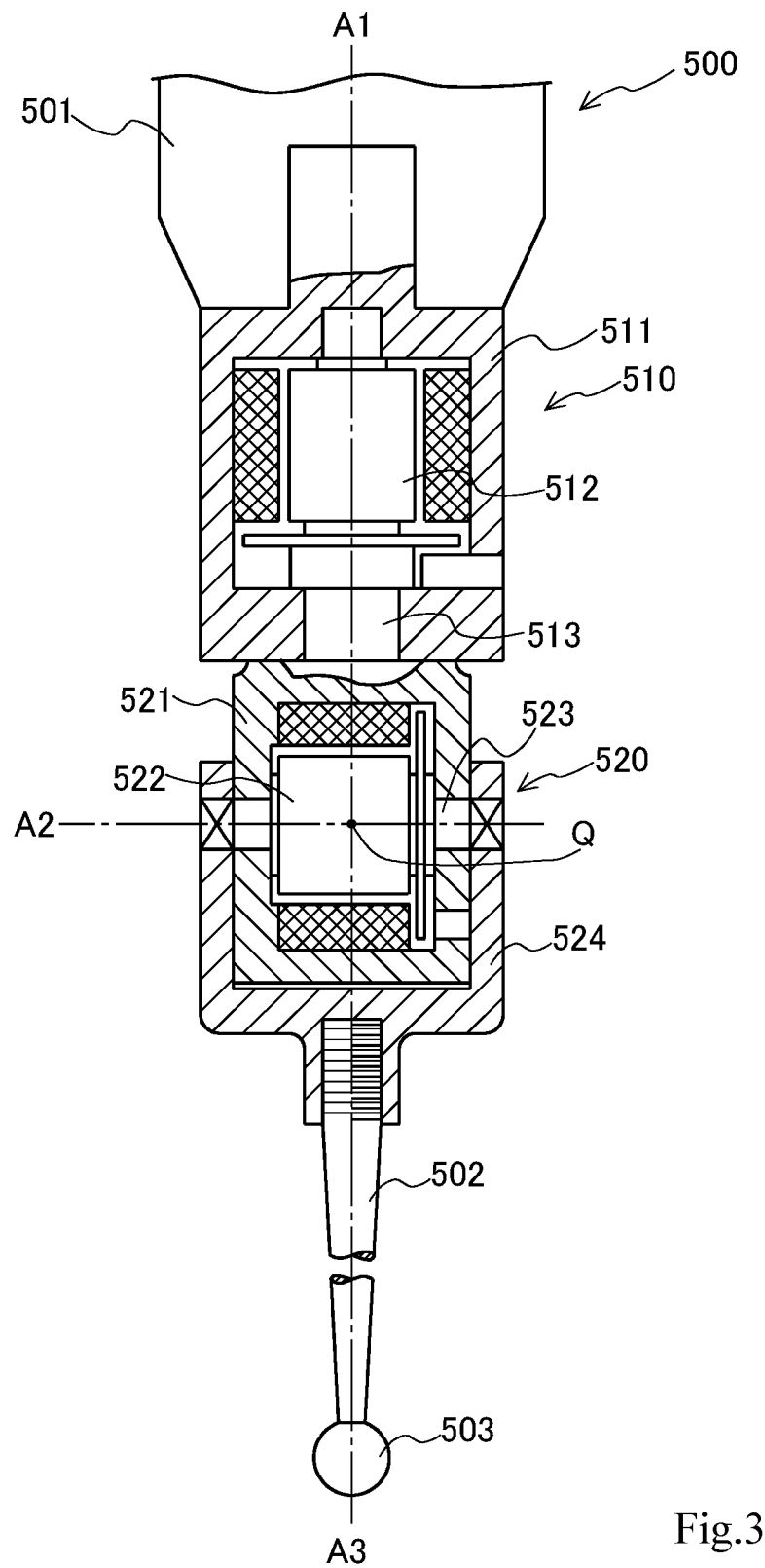
FIG. 3 is a cross-sectional view of the probe head.

FIG. 3 shows a cross-sectional view of the probe head 500.

The probe head 500 includes a head fixing part 501, a first rotation mechanism part 510, a second rotation mechanism part 520, and a stylus 502 having a measurement tip 503 at the tip.

The head fixing part 501 is attached to the lower end of the Z spindle 252.

The first rotation mechanism part 510 is provided at the lower end of the head fixing part 501.

The first rotation mechanism part 510 includes a first housing 511, a first motor 512, and a first shaft 513.

The first housing 511 is attached to the lower end of the head fixing part 501.

The first motor 512 is installed inside the first housing 511, and the first shaft 513 is attached to the armature of the first motor 512.

Here, the rotation axis of the first shaft 513 is a first rotation axis A1.

In the present exemplary embodiment, the axis line direction of the first rotation axis A1 corresponds to the Z-axis direction.

The second rotation mechanism part 520 includes a second housing 521, a second motor 522, a second shaft 523, and a U-shaped connecting frame 524.

The second housing 521 is connected to the first shaft 513.

The second motor 522 is installed inside the second housing 521, and the second shaft 523 is attached to the armature of the second motor 522.

Here, the rotation axis of the second shaft 523 is a second rotation axis A2. At this time, (the extension line of) the first rotation axis A1 is perpendicular to the second rotation axis A2. The U-shaped connecting frame 524 is attached to the second shaft 523, and the U-shaped connecting frame 524 rotates about the second rotation axis A2 as the rotation center.

The stylus 502 is attached to the lower end of the U-shaped connecting frame 524. Note that, (the extension line of) an axis line A3 of the stylus 502 is perpendicular to the second rotation axis A2.

Here, (the extension line of) the first rotation axis A1, the second rotation axis A2, and (the extension line of) the axis line A3 of the stylus 502 intersect at an intersection point.

For the following description, the intersection point is referred to as a rotation center Q.

Furthermore, the rotating angle of the first rotation axis A1 is indicated by $\alpha$ that satisfies $-180°\le\alpha\le180°$.

(The movement range does not need to be restricted as long as the probe head 500 is electrically connected, and the rotational motion itself is not restricted.)

In FIG. 2 or 3, it is assumed that the front side is 0°, the counterclockwise direction when viewed from the above is the rotation in the positive direction, and the clockwise direction is the rotation in the negative direction.

Furthermore, the rotating angle of the second rotation axis A2 is indicated $\beta$ that satisfies $0°\le\beta\le90°$. When the stylus 502 faces vertically downward, $\beta$ is set as 0°. Naturally, the reference point of 0° is arbitrary.

The first motor 512 and the second motor 522 are, for example, stepping motors, and driven in synchronization with applied drive pulses. That is, the movement quantity (rotating angle) of each of the first rotation mechanism part 510 and the second rotation mechanism part 520 is proportional to the number of drive pulses.

The probe head 500 further includes a probe sensor (not shown) that detects the displacement of the stylus 502 in order to detect the contact of the measurement tip 503 with the workpiece surface. The probe sensor outputs the detection value to the motion controller 300.

Note that, in the following description, it is assumed that the X-drive axis, the Y-drive axis, and the Z-drive axis, in addition to the first rotation mechanism part 510 and the second rotation mechanism part 520, are also driven by drive pulses, and that the response characteristics of the first rotation mechanism part 510, the second rotation mechanism part 520, an X-drive axis 240, the Y-drive axis 230, and the Z-drive axis 250 are the same.

Hereinafter, the control method in the present embodiment will be described based on the assumption that the response characteristics of five axes are the same.

If the response characteristics of the five axes are different, the control gain of the element having delay is to be adjusted.

The host computer 400 receives, from an external CAD system or the like, CAD data including path information such as non-uniform rational B-spline (NURBS) data, and generates measurement path information.

The generated measurement path information is given to the motion controller 300, and the motion controller 300 controls the respective drive axes of the coordinate measuring machine 200 and the probe head 500 so that the measurement tip 503 performs scanning measurement to the surface of the workpiece along the measurement path.

(Method for Controlling Shape Measuring Apparatus)

A method for controlling a shape measuring apparatus according to the present embodiment will be described below.

Before specific control steps are described, the movement of the shape measuring apparatus that is to be achieved in the present embodiment is briefly described.

Figure 4:
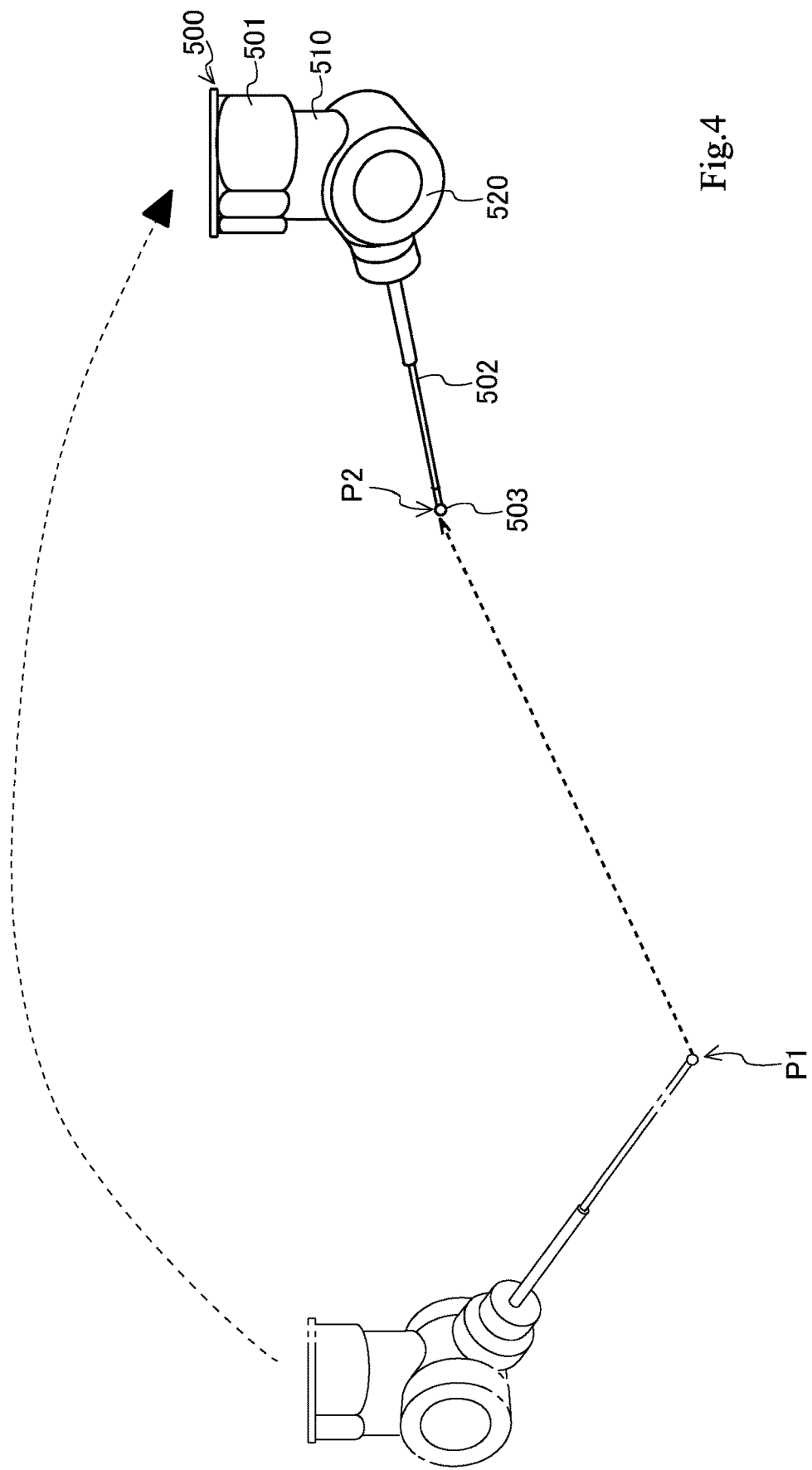
FIG. 4 is a diagram showing an example of movement of the probe head.

For example, as exemplified in FIG. 4, the case in which the probe head 500 is moved from a first point P1 to a second point P2 is described.

(At this time, the posture ($\alpha$, $\beta$) of the probe head 500 as well as the three-dimensional location (X, Y, Z) are changed.)

When the probe head 500 is changed in the location and the posture, it is necessary to take the rotational motion of the first rotation mechanism part 510 and the second rotation mechanism part 520 into consideration, and thus the movement locus of the measurement tip 503 cannot be a straight line.

In this regard, the movement path of the measurement tip 503 is to be easily predicted in the present exemplary embodiment. More specifically, the movement locus of the measurement tip 503 is to be a straight line.

With reference to the flowcharts (FIGS. 5 and 7), specific control steps are described in order.

Figure 5:
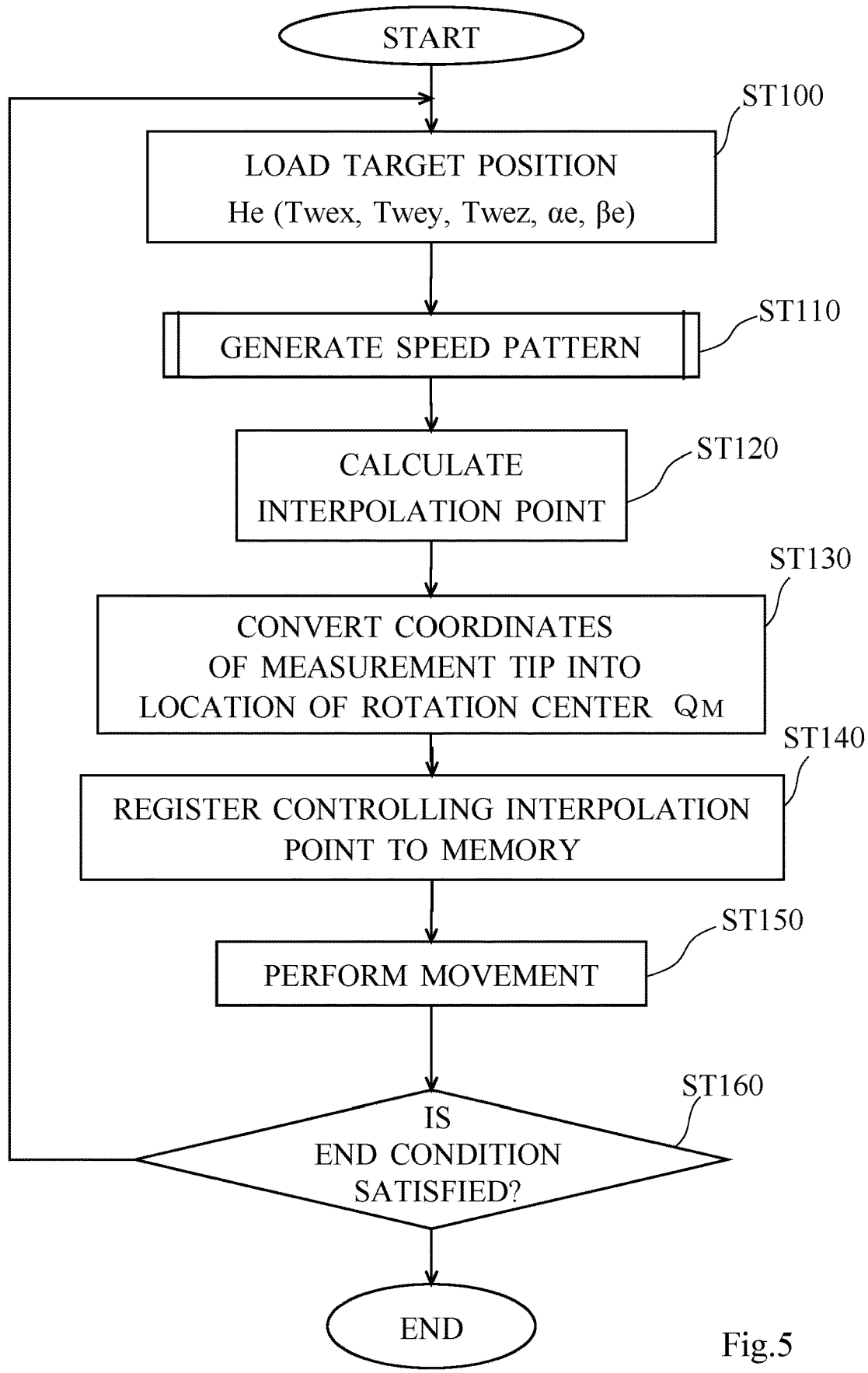
FIG. 5 is a flowchart explaining a method for controlling a shape measuring apparatus.
Figure 7:
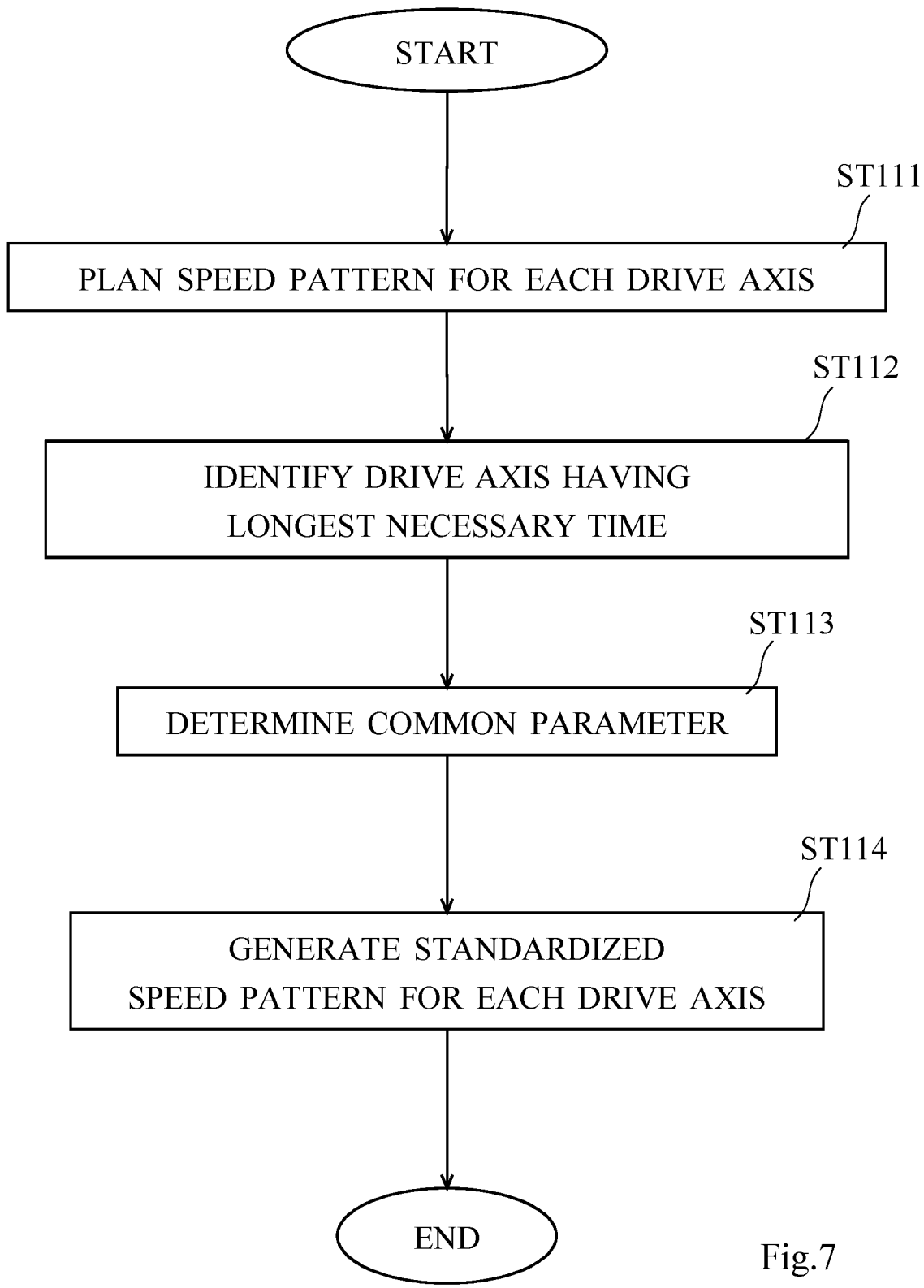
FIG. 7 is a flowchart explaining a procedure of generating a speed pattern for each drive axis.

The steps in FIGS. 5 and 7 is mainly performed by the motion controller 300.

First, in ST100, the motion controller 300 sequentially reads the measurement path information received from the host computer 400, and loads the next target position He (Twex, Twey, Twez, $\alpha$e, $\beta$e).

Here, in order to control the movement and posture of the probe head 500, the three-dimensional coordinate location (x, y, z) and the posture of the probe head 500 (the target angles ($\alpha$, $\beta$) of the first rotation mechanism part 510 and the second rotation mechanism part 520) are required.

The combination of the coordinate location (x, y, z) and the posture ($\alpha$, $\beta$) is indicated by the term "position".

In order to simply indicate a three-dimensional coordinate location (x, y, z), the term "location" is used.

Furthermore, the movement control of the coordinate measuring machine 200 and the probe head 500 needs various coordinate systems such as a workpiece coordinate system, a probe coordinate system, and a machine coordinate system. The type of a coordinate system is specified if needed, or the type of a coordinate system is omitted if not needed or being obvious from the context.

In a command given from the host computer 400 to the motion controller 300, the three-dimensional coordinate location is given as coordinates Twi of the measurement tip 503 on the workpiece coordinate system.

$$Twi=(Twix, Twiy, Twiz)$$

Figure 6:
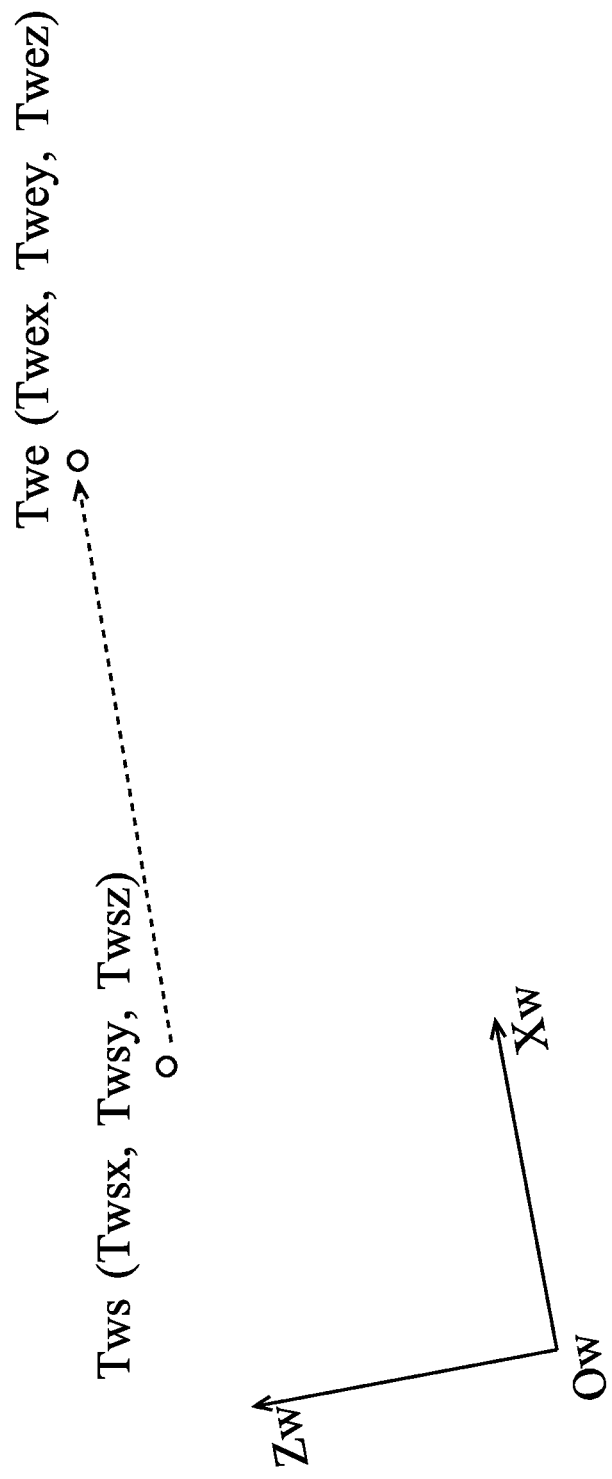
FIG. 6 is a diagram showing an example of displacement from a current location Tws (Twsx, Twsy, Twsz) to a target location Twe (Twex, Twey, Twez)

The current location is indicated by Tws=(Twsx, Twsy, Twsz) and the target location is indicated by Twe=(Twex, Twey, Twez) (see FIG. 6).

The target angles ($\alpha$, $\beta$) of the first rotation mechanism part 510 and the second rotation mechanism part 520 are given on the probe coordinate system.

Furthermore, the combination of the location on the workpiece coordinate system and the angles on the probe coordinate system is the position Hi (Twix, Twiy, Twiz, $\alpha$i, $\beta$i).

The current position is indicated by Hs (Twsx, Twsy, Twsz, $\alpha$s, $\beta$s) and the target position is indicated by He (Twex, Twey, Twez, $\alpha$e, $\beta$e).

When the next target position He (Twex, Twey, Twez, $\alpha$e, $\beta$e) is set (ST100), the motion controller 300 generates a speed pattern for controlling each drive axis so that the measurement tip 503 reaches the target position (ST110).

The generation procedure of the speed pattern (ST110) is described with reference to the flowchart in FIG. 7.

In ST111, the motion controller 300 plans a speed pattern for each drive axis.

This processing itself is a conventional method.

The current position Hs (Twsx, Twsy, Twsz, $\alpha$s, $\beta$s) and the target position He (Twex, Twey, Twez, $\alpha$e, $\beta$e) are given. There are known various methods for generating a speed pattern in which the movement is started from the current position at the initial speed zero, accelerated, changed to a constant speed when reaching an upper limit speed, then decelerated, and stopped at the target position (for example, JP 2014-48095).

Here, as shown in FIGS. 8 to 12, it is assumed that the speed pattern for each drive axis is calculated.

Figure 8:
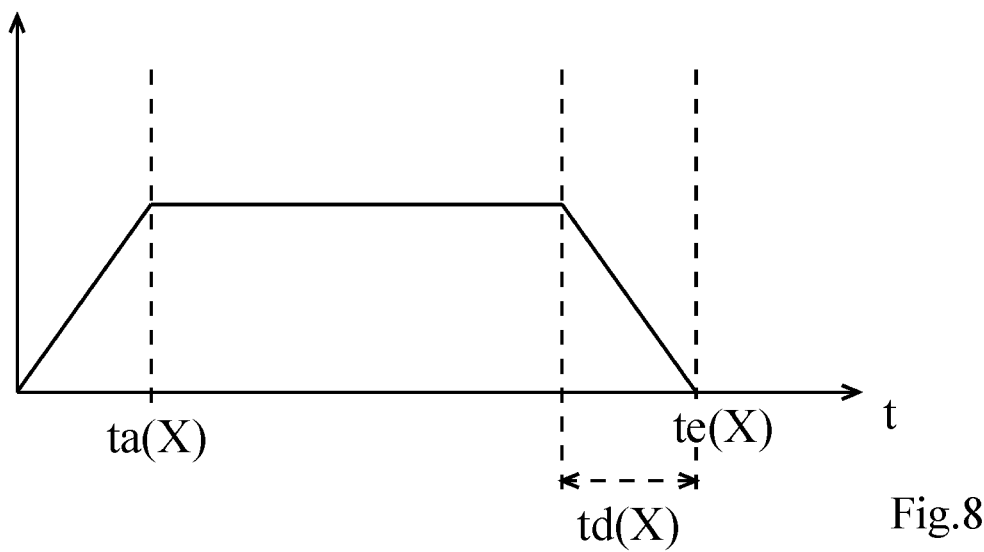
FIG. 8 is a diagram showing an example of a speed pattern of an X-drive axis.
Figure 9:
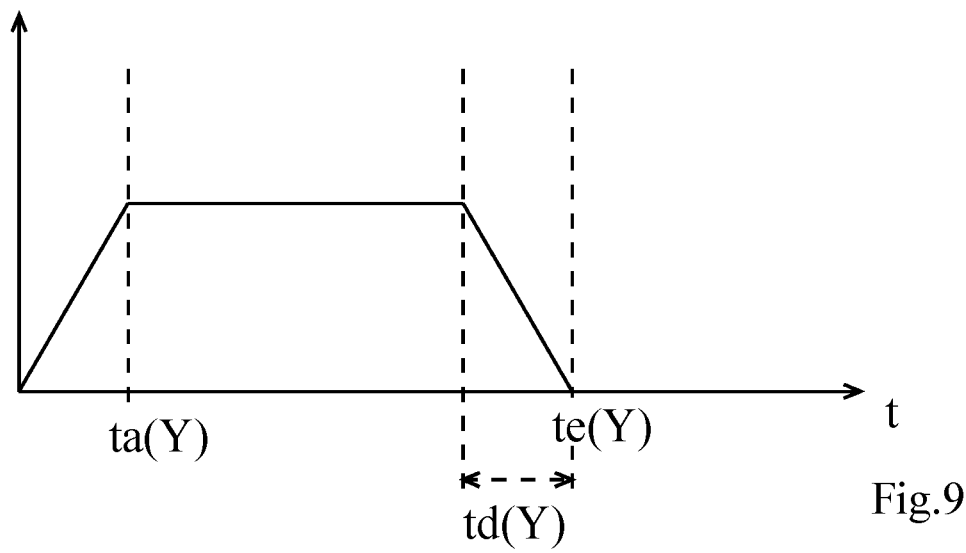
FIG. 9 is a diagram showing an example of a speed pattern of a Y-drive axis.
Figure 10:
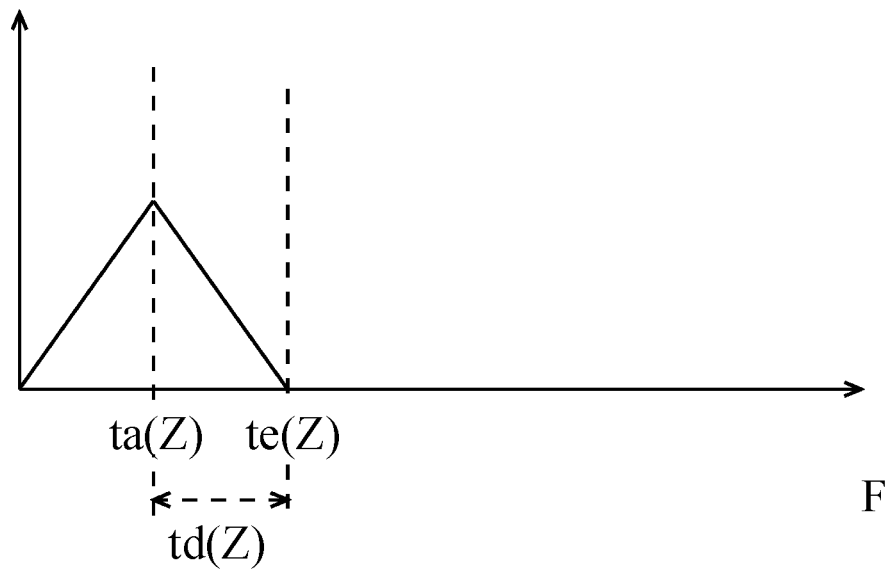
FIG. 10 is a diagram showing an example of a speed pattern of a Z-drive axis.

FIGS. 8, 9, and 10 are the speed patterns of the X-drive axis 240, the Y-drive axis 230, and the Z-drive axis 250 (more specifically, the moving speed patterns of the X slider 241, the Y slider 231, and the Z spindle 252) respectively of the coordinate measuring machine 200.

For example, FIG. 8 is the speed pattern of the X-drive axis 240.

The X slider 241 is accelerated until time ta (X) to reach the upper limit speed, changed to the constant speed, and stopped at time te (X).

In FIGS. 8, 9, and 10, the notation rule for indexes is unified, and redundant description is omitted.

Note that, if a speed pattern has a region of constant speed movement as shown in FIG. 8 (the X-drive axis 240) and FIG. 9 (the Y-drive axis 230), such a movement mode is referred to as a trapezoid mode.

Alternatively, if a speed pattern does not have a region of constant speed movement since deceleration is started before reaching the upper limit speed as shown in FIG. 10 (the Z-drive axis 250), such a movement mode is referred to as a triangle mode.

Figure 11:
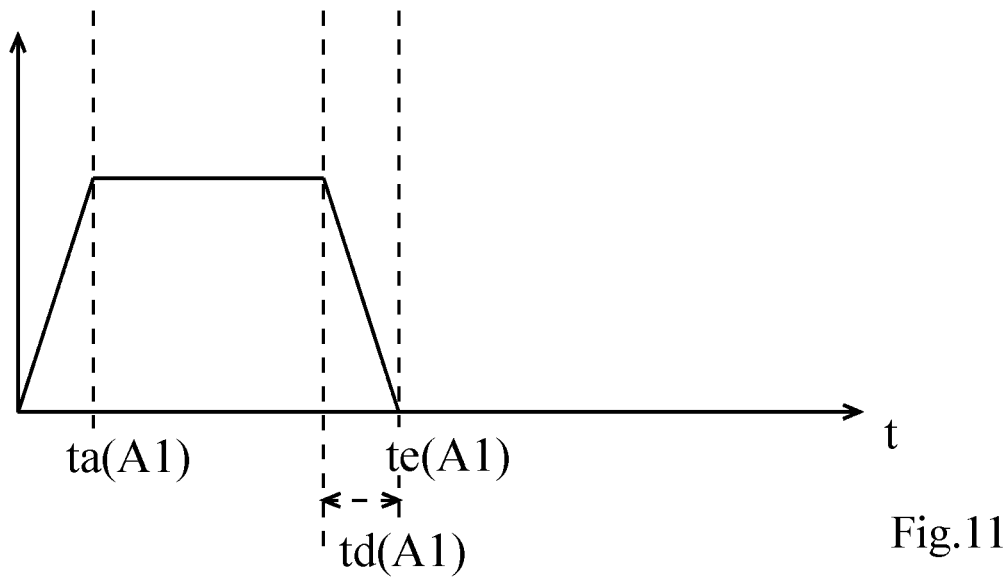
FIG. 11 is a diagram showing an example of a speed pattern of a first rotation mechanism part.
Figure 12:
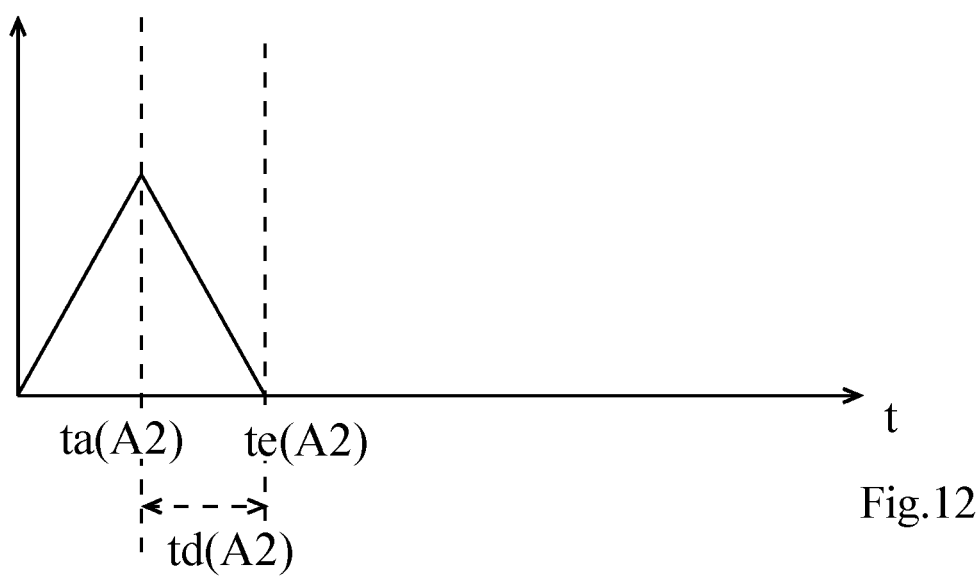
FIG. 12 is a diagram showing an example of a speed pattern of a second rotation mechanism part.

Similarly, FIGS. 11 and 12 are the speed patterns of the first rotation mechanism part 510 and the second rotation mechanism part 520 (more specifically, the rotating angular speeds of the first motor 512 and the second motor 522) respectively of the probe head 500.

As shown in FIGS. 8 to 12, when the speed pattern for each drive axis is calculated, then, the processing for synchronizing all axes is performed.

In ST112, the motion controller 300 identifies the drive axis having the longest necessary time by comparing te (X) to te (A2).

Here, it is assumed that the movement in the X-axis direction is the longest, which means that te (X) is the longest. Then, the parameter of the drive axis having the longest necessary time te is set as a common parameter (ST113).

As common parameters, a common movement time tec, a common movement mode, a common acceleration time tac, and a common deceleration time tdc are determined.

Here, based on the speed pattern of the X-drive axis 240, the common movement time tec is the movement time te (X) in the X-drive axis, the common movement mode is the trapezoid mode, the common acceleration time tac is ta (X), and the common deceleration time tdc is td (X).

Next, in ST114, a standardized speed pattern is calculated for each drive axis.

Figure 13:
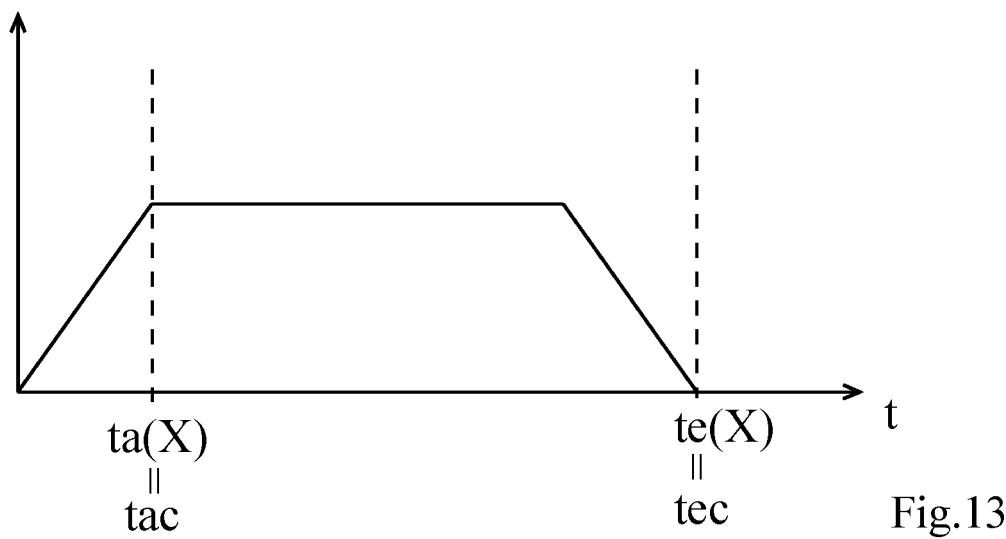
FIG. 13 is a diagram schematically showing that a common parameter is extracted from the speed pattern of the X-drive axis.
Figure 14:
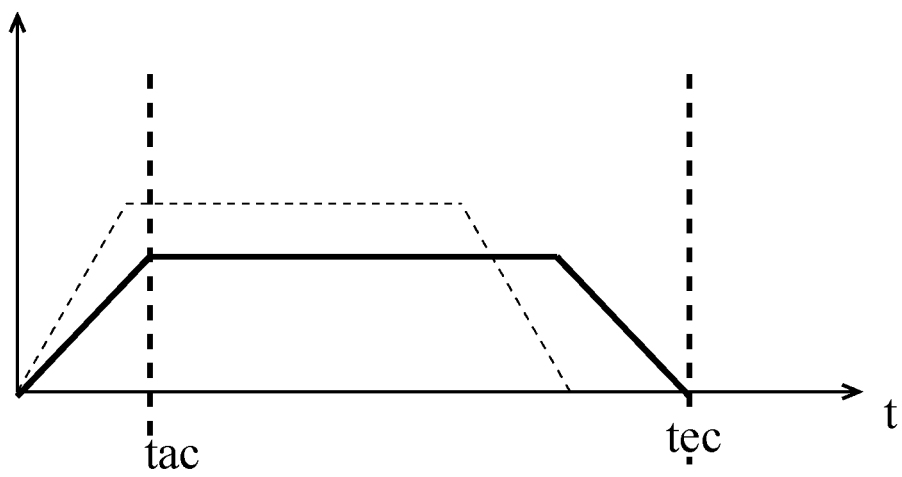
FIG. 14 is a diagram showing an example of a standardized speed pattern of the Y-drive axis.
Figure 15:
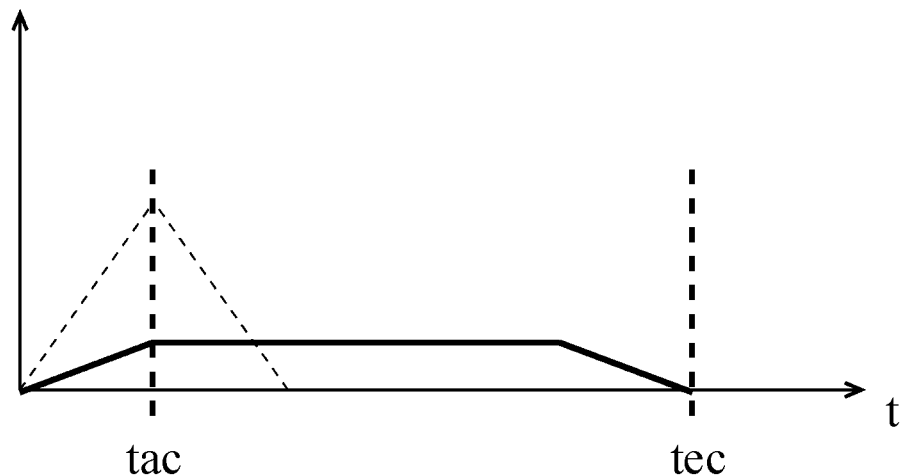
FIG. 15 is a diagram showing an example of a standardized speed pattern of the Z-drive axis.
Figure 16:
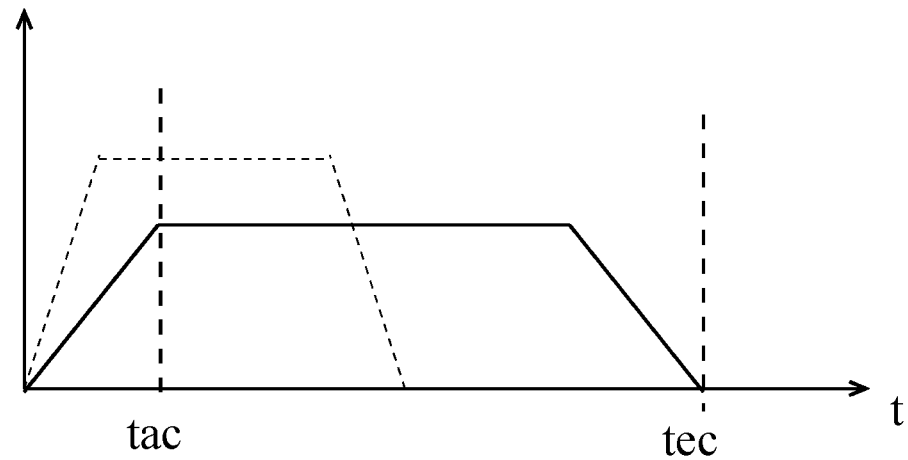
FIG. 16 is a diagram showing an example of a standardized speed pattern of the first rotation mechanism part.

In the speed pattern of the X-drive axis 240 having the longest necessary time, the common parameters are originally used, and a standardized speed pattern for the X-drive axis does not need to be calculated (FIG. 13).

In the speed pattern of each axis other than the X-drive axis, the movement time te, the movement mode, the acceleration time ta, and the deceleration time td are adjusted to the common parameters (FIGS. 14 to 17).

Figure 17:
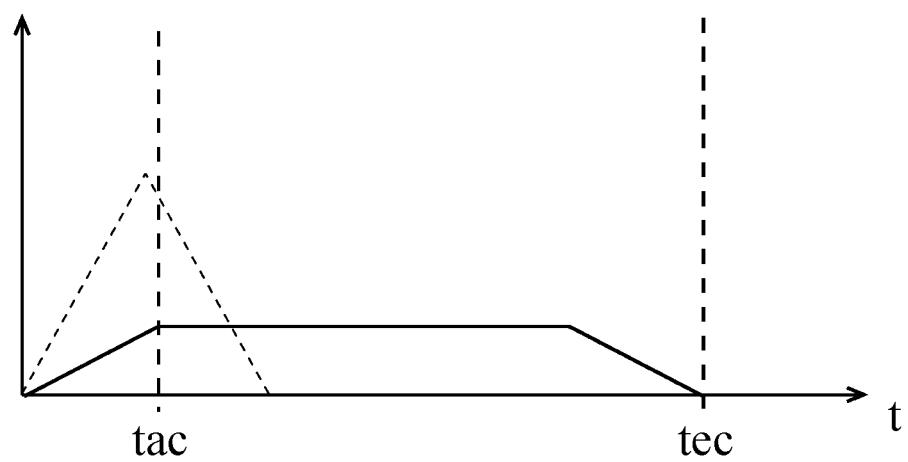
FIG. 17 is a diagram showing an example of a standardized speed pattern of the second rotation mechanism part.

For example, the second rotation mechanism part 520 is exemplified (FIG. 17).

The original movement mode of the second rotation mechanism part 520 is a triangle mode, but the triangle mode is changed to a trapezoid mode. Then, the acceleration time ta (A2) is adjusted to the common acceleration time tac, the deceleration time td (A2) is adjusted to the common deceleration time tdc, and the movement time te (A2) is adjusted to the common movement time tec.

However, the movement distance (rotating angle) needs to remain the same, and the magnitude of the acceleration is adjusted so that the movement distance (rotating angle) before and after the standardization is the same.

In this manner, the speed patterns in which the five axes are synchronized by the common parameters are obtained (FIGS. 13 to 17).

Now, the speed patterns in which the five axes are synchronized by the common parameters are generated (FIG. 7), the processing returns to FIG. 5, and an interpolation point which is the target in each control period is calculated (ST120).

In other words, based on the assumption that a control period of the motion controller 300 is Δt, the target point in each control period is calculated for each drive axis.

The target point in each control period is referred to as an interpolation point.

The quotient obtained by dividing the common movement time tec by a control period Δt is n.

$$n=(tec/\Delta t)$$

By dividing the times of the speed patterns of the five drive axes into n-equal parts and sequentially adding an increment in each control period Δt, the interpolation point is calculated.

Figure 18:
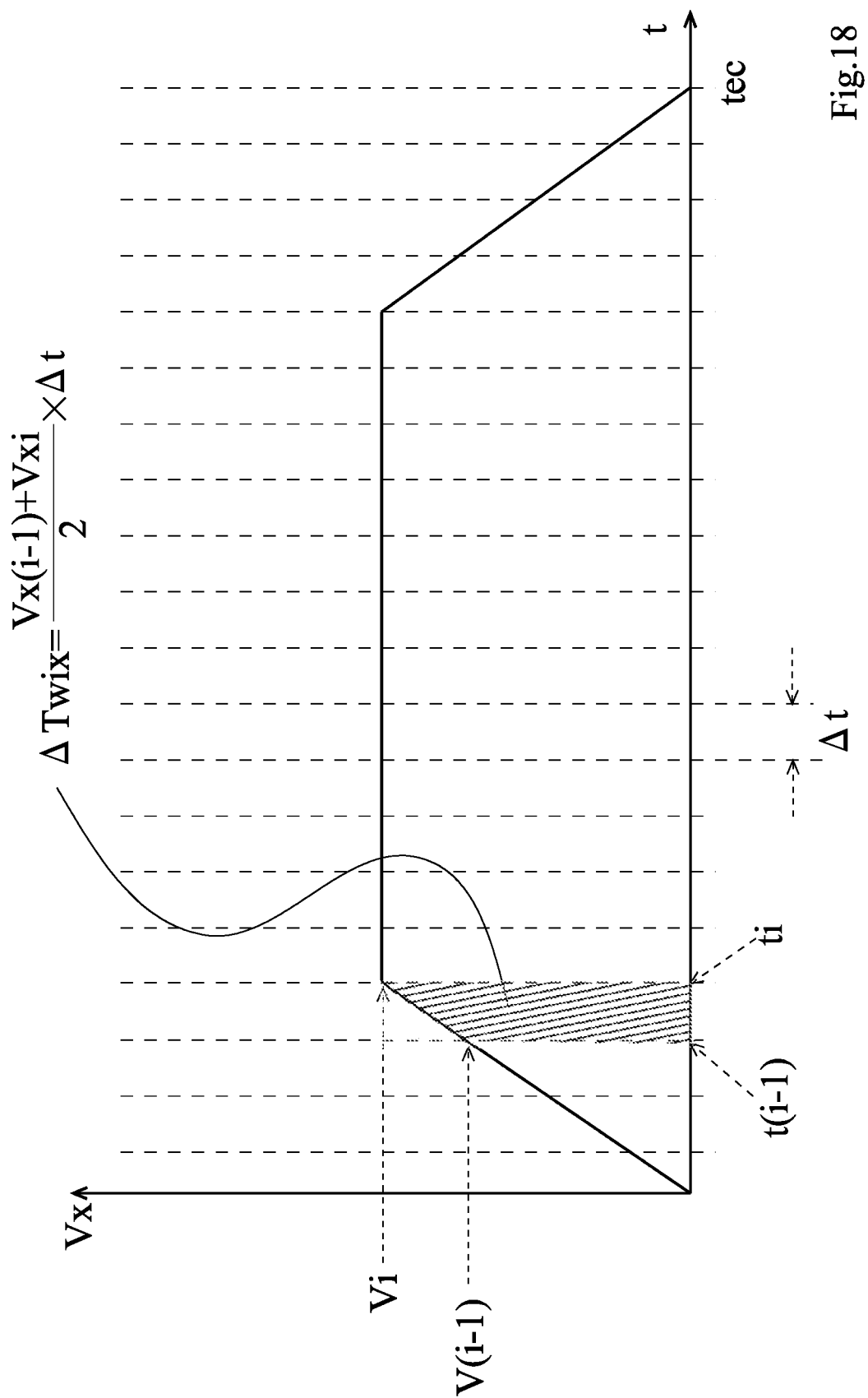
FIG. 18 is a diagram schematically showing that interpolation points of the X-drive axis are sequentially calculated.

FIG. 18 is a diagram schematically showing that the interpolation points in the X-drive axis are sequentially calculated.

Note that, in FIG. 18, the displacement quantity ΔTwix in a control period Δt is calculated by $((V_{x(i-1)}+V_{xi})\times \Delta t/2)$, but may be calculated by $V_{x(i-1)}\times\Delta t$, or $Vi\times\Delta t$. Alternatively, if the speed pattern is curved, the displacement quantity ΔTwix may be calculated by being more finely calculated (integrated).

In this manner, the interpolation point is calculated for each drive axis.

Hi (Twix, Twiy, Twiz, αi, βi)

In ST120, the interpolation point Hi (Twix, Twiy, Twiz, αi, βi) is calculated, but Twi (Twix, Twiy, Twiz) is given as a point on the workpiece coordinate system.

In order for the coordinate measuring machine 200 to perform drive control, the point on the workpiece coordinate system needs to be converted into a command on the machine coordinate system. The command is given as the coordinates of the measurement tip 503 on the workpiece coordinate system. In the present embodiment, the coordinates on the workpiece coordinate system is converted into the coordinates of the rotation center $Q_M$ of the probe head 500 on the machine coordinate system (ST130).

Note that, the location of the rotation center Q of the probe head 500 on the machine coordinate system is indicated by $Q_M$.

The location of the rotation center Q of the probe head 500 on the workpiece coordinate system is indicated by $Q_W$. In addition, the location of the rotation center Q of the probe head 500 on the probe coordinate system is indicated by $Q_P$.

The conversion expression is described.

First, how the rotation center Qp is indicated with respect to the first rotating angle α and the second rotating angle β on the probe coordinate system is described.

Figure 19:
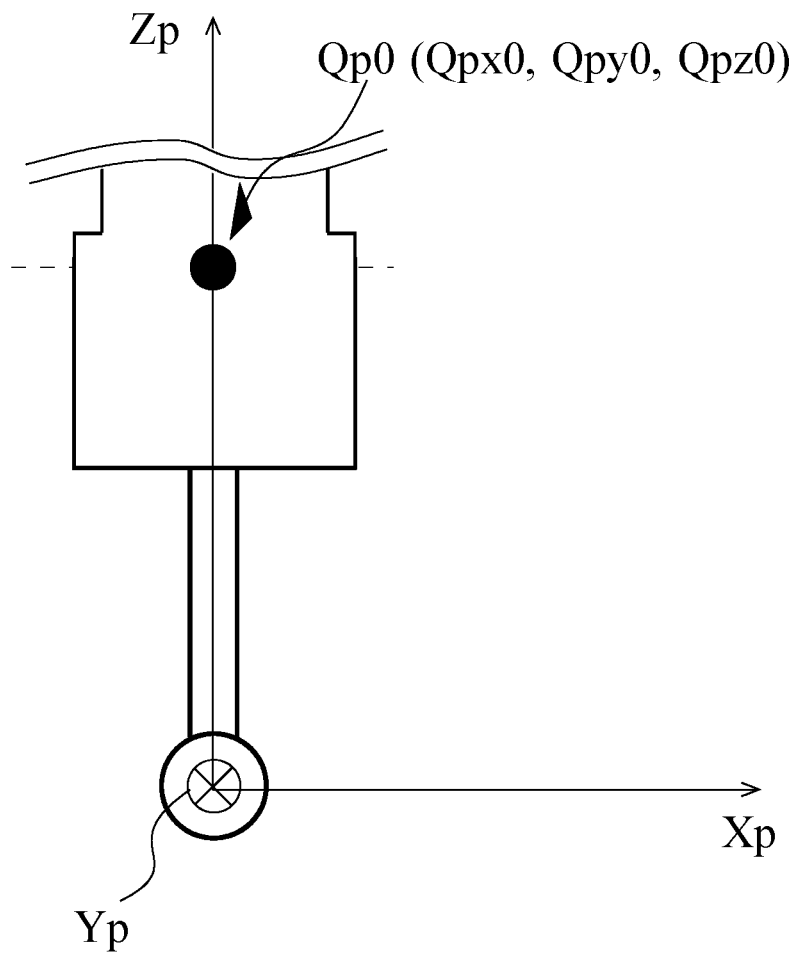
FIG. 19 is a diagram showing the location of a rotation center Qp0 in a probe coordinate system when a first rotating angle $\alpha$ and a second rotating angle $\beta$ each equal zero.

Here, it is assumed that the coordinates of the rotation center Q are Qp0 (Qpx0, Qpy0, Qpz0) when the origin point of the probe coordinate system is set to (the center of) the measurement tip 503, and when the first rotating angle α and the second rotating angle β each equal zero (see FIG. 19). Then, it is assumed that the coordinates of the rotation center Q are indicated by Qp (Qpx, Qpy, Qpz) when the first rotating angle is α and the second rotating angle is β (FIG. 20).

Figure 20:
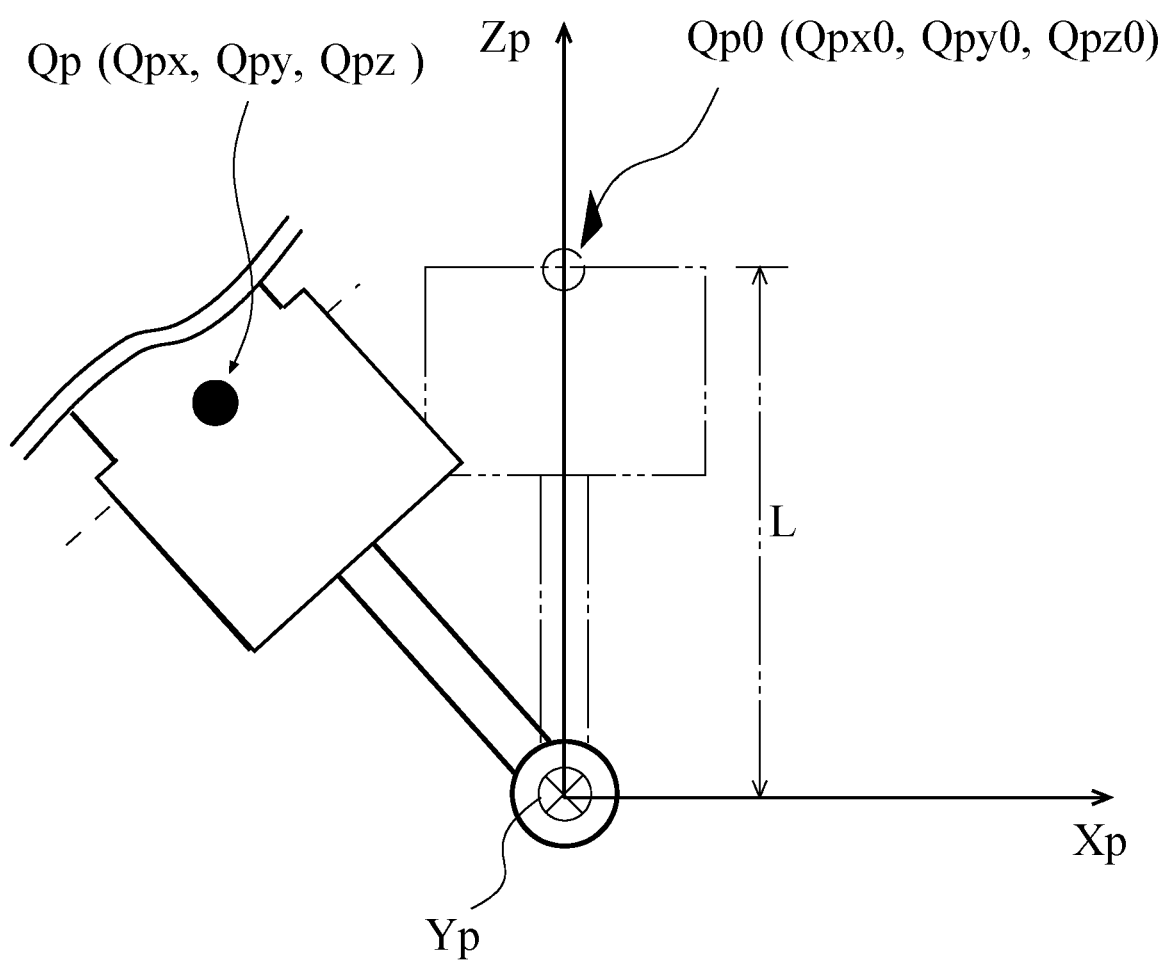
FIG. 20 is a diagram explaining a conversion expression for obtaining the location of a rotation center Qp in a probe coordinate system when a first rotating angle is $\alpha$ and the second rotating angle is $\beta$.

At this time, the rotation center Qp at the first rotating angle α and the second rotating angle β is at the location where Qp0 (Qpx0, Qpy0, Qpz0) is rotated about the first rotation axis by α and about the second rotation axis by β (for example, see FIG. 20).

[Expression 1]

$$\begin{pmatrix} Q_{px} \\ Q_{py} \\ Q_{pz} \end{pmatrix} = \begin{pmatrix} \cos\alpha & -\sin\alpha & 0 \\ \sin\alpha & \cos\alpha & 0 \\ 0 & 0 & 1 \end{pmatrix} \begin{pmatrix} 1 & 0 & 0 \\ 0 & \cos\beta & \sin\beta \\ 0 & -\sin\beta & \cos\beta \end{pmatrix} \begin{pmatrix} Q_{px0} \\ Q_{py0} \\ Q_{pz0} \end{pmatrix}$$

For example, it is assumed that the coordinates Qp0 of the rotation center Q when the first rotating angle α and the second rotating angle β each equal zero is (0, 0, L).

At this time, the coordinates Qp (Qpx, Qpy, Qpz) of the rotation center Q at an arbitrary first rotating angle α and second rotating angle β are as follows:

$$\begin{pmatrix} Q_{px} \\ Q_{py} \\ Q_{pz} \end{pmatrix} = \begin{pmatrix} \cos\alpha & -\sin\alpha & 0 \\ \sin\alpha & \cos\alpha & 0 \\ 0 & 0 & 1 \end{pmatrix} \begin{pmatrix} 1 & 0 & 0 \\ 0 & \cos\beta & \sin\beta \\ 0 & -\sin\beta & \cos\beta \end{pmatrix} \begin{pmatrix} 0 \\ 0 \\ L \end{pmatrix} \quad \text{[Expression 2]}$$

$$= \begin{pmatrix} -L \cdot \sin\alpha \cdot \sin\beta \\ L \cdot \cos\alpha \cdot \sin\beta \\ L \cdot \cos\beta \end{pmatrix}$$

The interpolation point Hi (Twix, Twiy, Twiz, αi, βi) has been calculated as the target point in each control period Δt.

The rotation center Qwi corresponding to each controlling interpolation point Hi needs to be calculated.

With regard to the first rotating angle α and the second rotating angle β, αi and βi have been calculated as the interpolation points in each control period.

The interpolation point Qpi (Qpix, Qpiy, Qpiz) of the rotation center Qpi on the probe coordinate system is calculated using the first rotating angle αi and the second rotating angle βi at that time.

$$\begin{pmatrix} Q_{pix} \\ Q_{piy} \\ Q_{piz} \end{pmatrix} = \begin{pmatrix} \cos\alpha i & -\sin\alpha i & 0 \\ \sin\alpha i & \cos\alpha i & 0 \\ 0 & 0 & 1 \end{pmatrix} \begin{pmatrix} 1 & 0 & 0 \\ 0 & \cos\beta i & \sin\beta i \\ 0 & -\sin\beta i & \cos\beta i \end{pmatrix} \begin{pmatrix} Q_{px0} \\ Q_{py0} \\ Q_{pz0} \end{pmatrix} \quad \text{[Expression 3]}$$

Since the coordinates of the above rotation center Qpi (Qpix, Qpiy, Qpiz) are on the probe coordinate system (in which the measurement tip 503 is set as the origin point), the coordinates are converted into those on the workpiece coordinate system.

Figure 21:
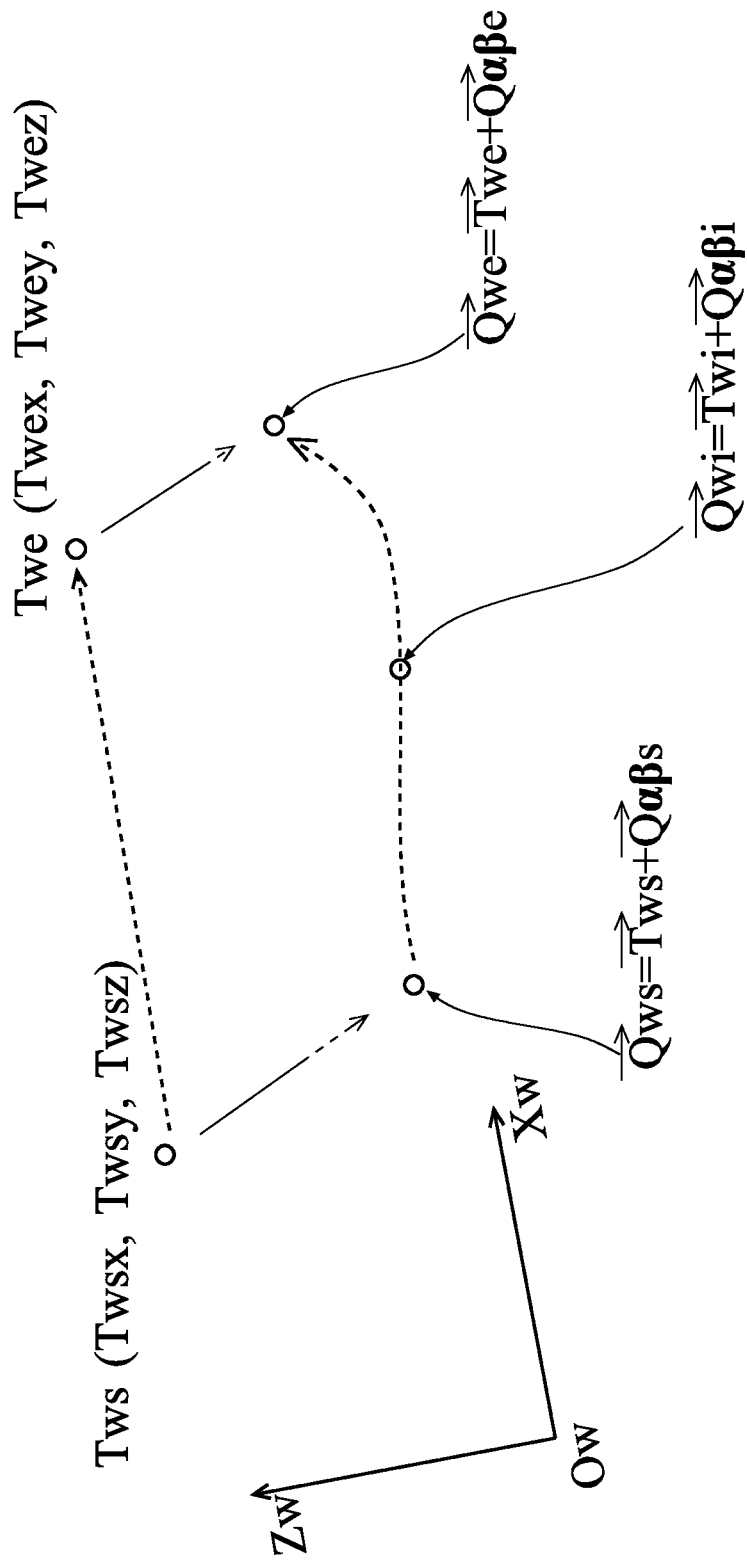
FIG. 21 is a diagram schematically showing that the coordinates of the rotation center Qp in the probe coordinate system is converted into the coordinates in a workpiece coordinate system.

The coordinates of the rotation center Qwi (Qwix, Qwiy, Qwiz) on the workpiece coordinate system are as follows (see FIG. 21).

Note that, it is assumed that only the origin point on the probe coordinate system is deviated from that on the workpiece coordinate system, and that the respective X-axes, Y-axes, and Z-axes on the both coordinate systems are parallel. If the directions of the axes on the probe coordinate system are deviated from those on the workpiece coordinate system, rotation elements are also required.

$$Qwi = Twi + Qpi$$

(Qwi, Twi, and Qpi are vectors)
The elements are explicitly expressed as follows:

$$\begin{pmatrix} Q_{wix} \\ Q_{wiy} \\ Q_{wiz} \end{pmatrix} = \begin{pmatrix} T_{wix} \\ T_{wiy} \\ T_{wiz} \end{pmatrix} + \begin{pmatrix} Q_{pix} \\ Q_{piy} \\ Q_{piz} \end{pmatrix} \quad \text{[Expression 4]}$$

Figure 22:
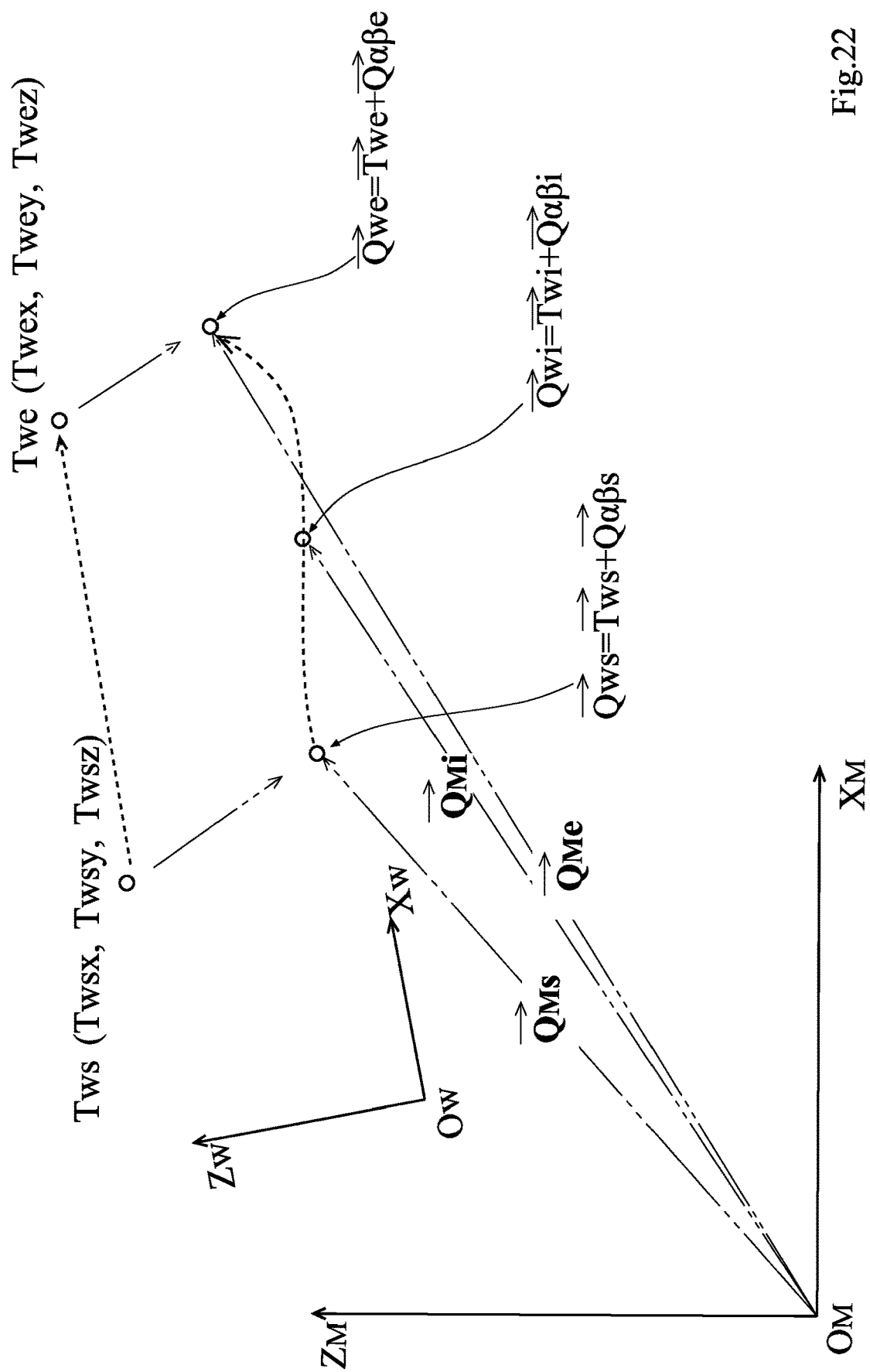
FIG. 22 is a diagram schematically showing that the coordinates of a rotation center Qw in a workpiece coordinate system is converted into the coordinates in a machine coordinate system.

In this manner, the rotation center Qwi on the workpiece coordinate system is calculated, and converted into the machine coordinate system (see FIG. 22). The conversion from the workpiece coordinate system to the machine coordinate system is expressed by the affine transformation $^M f_W$.

$$Q_{Mi} = {^M f_W} \cdot Qwi$$

($Q_{Mi}$ and Qwi are vectors)

The conversion $^M f_W$ from the workpiece coordinate system to the machine coordinate system is the combination of the rotation and the translation, and can be expressed as follows based on the assumption that the deviation between the origin points is the vector Ow and the rotation matrix is $^M C_W$:

$$Q_{Mi} = [_M C_W] Qwi + Ow$$

In this manner, a controlling interpolation point $Q_{Mi}$ on the machine coordinate system is calculated.

The calculated controlling interpolation point $Q_{Mi}$ is registered in a memory (not shown) (ST140), and positioning control is sequentially performed to the controlling interpolation point $Q_{Mi}$ stored in the memory (ST150). The difference between the current position and the target position is calculated for each drive axis, and the motor of each axis is driven at a drive pulse according to the difference.

When the control is performed, the movement locus of the measurement tip 503 is to be a straight line.

The meaning of the calculation is reviewed shortly.

When the probe head 500 is displaced from the current position Hs (Twsx, Twsy, Twsz, αs, βs) to the target position He (Twex, Twey, Twez, αe, βe), the location information shows the displacement from the current location Tws (Twsx, Twsy, Twsz) to the target location Twe (Twex, Twey, Twez) (see FIG. 6).

In order for the probe head 500 to be displaced from the current location Tws (Twsx, Twsy, Twsz) to the target location Twe (Twex, Twey, Twez), the X-drive axis 240, the Y-drive axis 230, and the Z-drive axis 250 of the coordinate measuring machine 200 are driven.

At this time, in order to generate the speed pattern (ST110), the common parameters are determined in ST113, and the standardized speed pattern using the common parameters is obtained in ST114 in the present embodiment.

For comparison, in order for the movement locus of the measurement tip 503 to simply be a straight line, the speed patterns of the X-drive axis 240, the Y-drive axis 230, and the Z-drive axis 250 need to be standardized by the common parameters, but the speed patterns of the first rotation mechanism part 510 and the second rotation mechanism part 520 do not need to be standardized.

The advantage of the standardization including the speed patterns of the first rotation mechanism part 510 and the second rotation mechanism part 520 is to be described later.

By the standardized speed pattern, the X-drive axis 240, the Y-drive axis 230, and the Z-drive axis 250 are started to move simultaneously, accelerated and decelerated for the same time, and simultaneously stopped at the target location.

In this manner, when the movements of the synchronized three axes are combined, the straight-line path directed from the current location Tws (Twsx, Twsy, Twsz) to the target location Twe (Twex, Twey, Twez) is generated (see FIG. 6).

Then, based on the assumption that a control period of the motion controller 300 is Δt, the interpolation point in each control period is calculated for each drive axis.

Hi (Twix, Twiy, Twiz, αi, βi)

Here, the locus of Ti (Twix, Twiy, Twiz) is a straight line. Then, the first rotating angle αi and the second rotating angle βi in the i-th control period are given as (αi, βi). The first rotating angle αi and the second rotating angle βi at that time are taken into consideration, and the coordinates Ti of the measurement tip 503 are converted into the coordinates Qi of the rotation center of the probe head 500. By setting the controlling interpolation point $Q_{Mi}$ ($Q_{Mix}$, $Q_{Miy}$, $Q_{Miz}$, $\alpha_i$, $\beta_i$) calculated in this manner as the positioning target point, when the movements of the five axes are combined, the locus of the measurement tip 503 is naturally to be a straight line.

(The Locus of the Rotation Center Q of the Probe Head 500 is not a Straight Line but can be a Curve)

As described above, according to the present embodiment, since the movement path of the measurement tip 503 is simplified (more specifically, a straight line) and predictable, it is possible to easily create a measurement part program (a measurement control program including a measurement point and measurement path of a workpiece). Furthermore, it is possible to avoid unintentional interference of the measurement tip 503 (or the stylus 502) with a workpiece.

Modified Example 1

The moving mechanism 220 of the coordinate measuring machine 200 can be originally controlled while the three axes are synchronized.

In this case, the speed pattern of the moving mechanism 220 of the coordinate measuring machine 200 is obtained as the speed pattern of the combined speed Vsyn in which the speeds of the X-drive axis 240, the Y-drive axis 230, and the Z-drive axis 250 are originally combined.

In this case, the processing (ST112 to ST114) for standardizing the speed patterns of the X-drive axis 240, the Y-drive axis 230, and the Z-drive axis 250 is not required, but the speed pattern of the moving mechanism 220 need to be divided to the X direction, the Y direction, and the Z direction to calculate the controlling interpolation point.

Here, it is assumed that the displacement $\Delta T_{syni}$ in a control period $\Delta t$ is $$((V_{syn(i-1)}+V_{syni})/2)\times \Delta t.$$

Furthermore, it is assumed that the direction cosine of the straight-line movement directed from the current location Tws (Twsx, Twsy, Twsz) to the target location Twe (Twex, Twey, Twez) is (I, J, K).

At this time, the following expression is satisfied: $\Delta Twxi=I\cdot \Delta Tsyni$, $\Delta Twyi=J\cdot \Delta Tsyni$, $\Delta Twzi=K\cdot \Delta Tsyni$.

Accordingly, the controlling interpolation point Twix, Twiy, Twiz are as follows:

$$T_{wix}=T_{w(i-1)x}+\Delta T_{wix}=T_{w(i-1)x}+I\cdot \Delta Tsyni$$

$$T_{wiy}=T_{w(i-1)y}+\Delta T_{wiy}=T_{w(i-1)y}+J\cdot \Delta Tsyni$$

$$T_{wiz}=T_{w(i-1)z}+\Delta T_{wiz}=T_{w(i-1)z}+K\cdot \Delta Tsyni$$

Modified Example 2

In the above embodiment, the command given as the coordinate values of the measurement tip 503 is converted into the coordinate values of the rotation center Q of the probe head 500, and the rotation center Q is set as the control target point.

On the other hand, the speed pattern (ST111) is calculated based on the movement of the measurement tip 503. Thus, the speed of the rotation center Q after the conversion processing may not be within the maximum speed, and the speed of the rotation center Q can exceed the maximum speed. In this case, taking the maximum speed of the rotation center Q into consideration, the moving speed of the measurement tip 503 needs to be corrected by being calculated backward.

For example, a part of or all the trajectory of the rotation center Q is a curved trajectory, and the acceleration (centrifugal force) can exceed the resistance to the acceleration of the coordinate measuring machine 200. Thus, the curvature radius r is calculated at each part of the trajectory (curve), and the acceleration of the rotation center of the probe head 500 is calculated from each curvature radius r and the speed V at the time. Then, if the acceleration exceeds the resistance a to the acceleration of the coordinate measuring machine 200, the speed pattern of the measurement tip 503 needs to be re-calculated so that the maximum speed $V_{Qmax}$ is restricted to $V_{Qmax} \leq \sqrt{(a\cdot r)}$.

Here, the reason that the speed patterns of not only the X, Y, and Z-drive axes 230 to 250 but also of the first rotation mechanism part 510 and the second rotation mechanism part 520 need to be standardized is described again.

If the movement locus of the measurement tip 503 is to simply be a straight line, the three axes of the X-drive axis 240, the Y-drive axis 230, and the Z-drive axis 250 are only required to be synchronized. However, if the first rotation mechanism part 510 and the second rotation mechanism part 520 are not synchronized with the three axes (the X-drive axis 240, the Y-drive axis 230, the Z-drive axis 250), the possibility that the curvature of the trajectory of the rotation center Q becomes larger is increased.

For example, it is assumed that the speed patterns of the first rotation mechanism part 510 and the second rotation mechanism part 520 are not synchronized and remain the patterns as shown in FIGS. 11 and 12.

Figure 23:
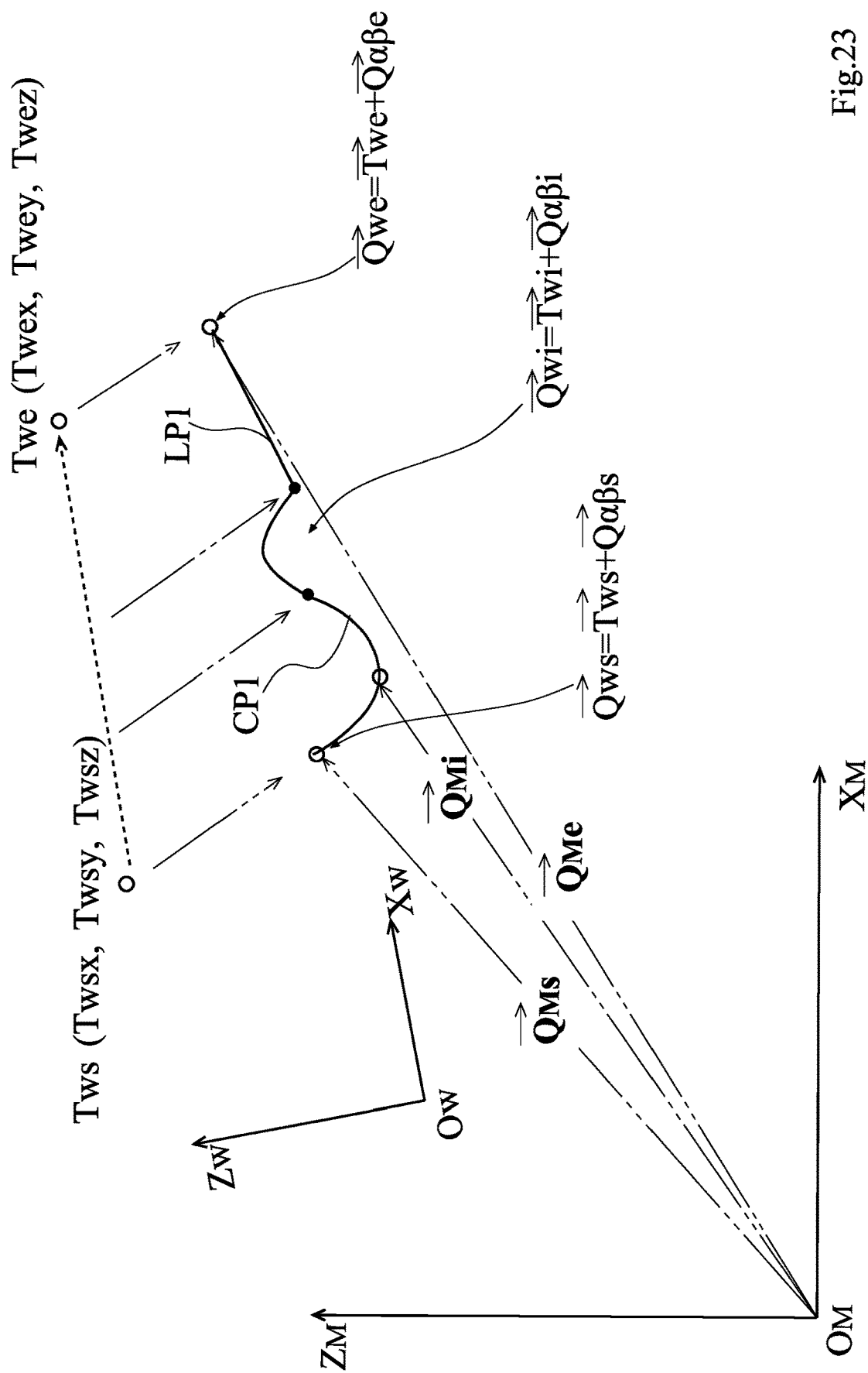
FIG. 23 is a diagram schematically showing an example of a trajectory of a rotation center Q when the first rotation mechanism part and the second rotation mechanism part are not synchronized with the X, Y, and Z-drive axes as a comparison example.

Then, it is expected that the trajectory of the rotation center Q passes through, for example, the curved trajectory CP1 and then moves in the straight line LP1 as shown in FIG. 23.

First, since the coordinate conversion includes the rotations of the first rotation mechanism part 510 and the second rotation mechanism part 520, the trajectory of the rotation center Q is to be the curve CP1. Then, when the first rotation mechanism part 510 and the second rotation mechanism part 520 are stopped, only the X-drive axis 240, the Y-drive axis 230, and the Z-drive axis 250 are driven, the rotation is not contributed, and the trajectory of the rotation center Q is to be the simple straight line LP1.

If there is a trajectory having a large curvature or a sudden change in direction in the trajectory of the rotation center Q, the acceleration of the rotation center Q can exceed the resistance to the acceleration of the coordinate measuring machine 200.

In contrast, as in the above embodiment, as long as all the five axes are synchronized, the locus of the rotation center Q is to be a gentle curve as a whole (see FIG. 21 or 22), and the possibility that the acceleration of the rotation center Q exceeds the resistance to the acceleration of the coordinate measuring machine 200 is reduced. Thus, taking the matter not only of a simple mathematical solution but also of the drive performance of the actual coordinate measuring machine 200 (for example, performance of resistance to acceleration) into consideration, it is preferable that all the five axes are controlled to be synchronized.

Note that, the present invention is not limited to the above embodiment, and can be modified without departing from the scope.

In the above example, the case in which the movement locus of the measurement tip 503 is to be a straight line has been exemplified.

Figure 24:
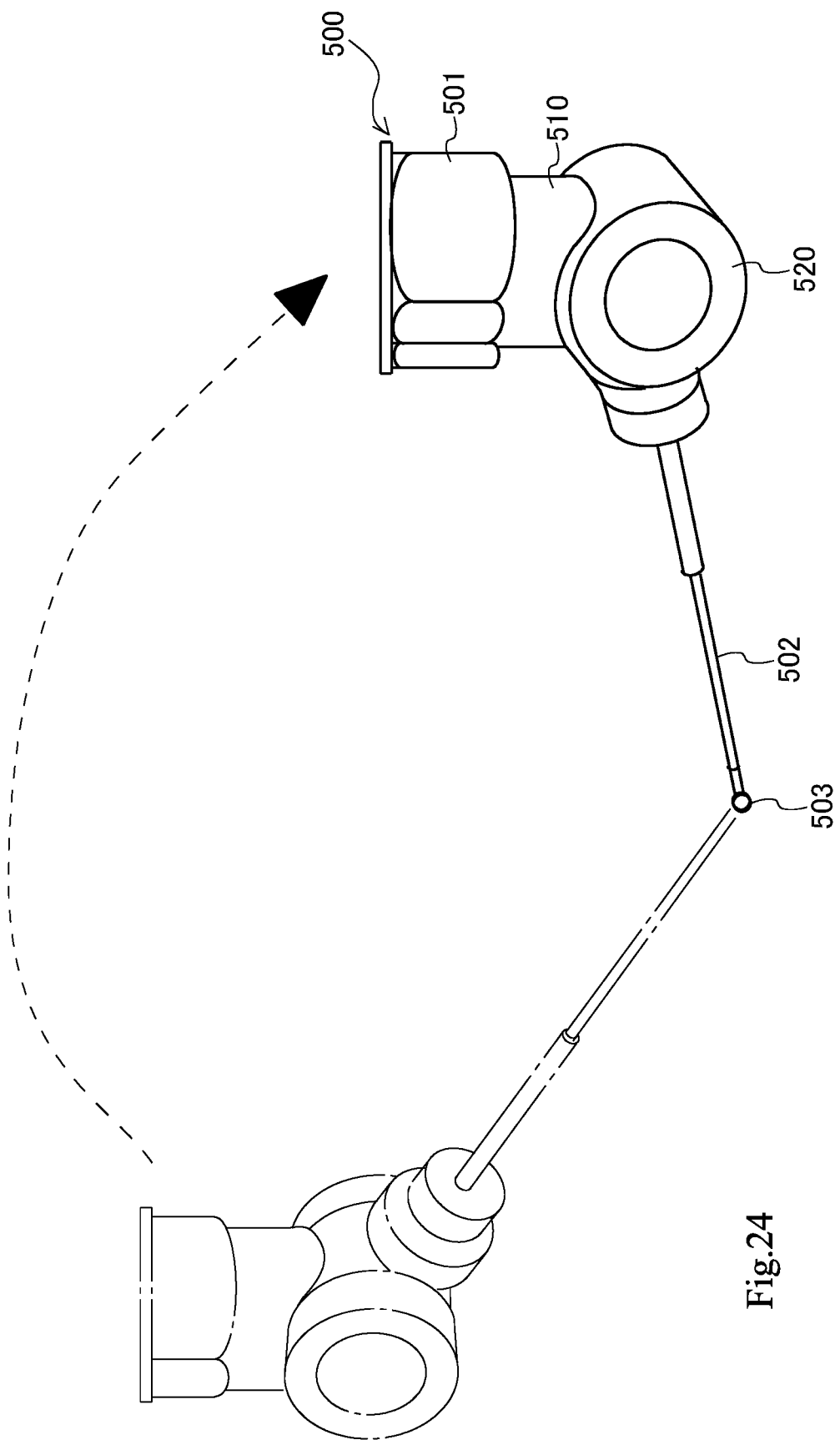
FIG. 24 is a diagram showing that only the posture of a probe head is changed while the displacement of a measurement tip remains zero.

In addition, there can be a case in which the location of the measurement tip 503 is not changed but only the posture of the probe head 500 is desired to be changed, for example, as shown in FIG. 24.

If the conventional technique is simply applied, the measurement tip 503 returns to the same location in the end, but the measurement tip 503 (the stylus 502) is expected to be considerably swung according to the rotation of the first rotation mechanism part 510 and the second rotation mechanism part 520 in the middle of the path.

Since the operator neither thinks of moving the measurement tip 503, nor expects that the measurement tip 503 (the stylus 502) interferes with the workpiece. However in practical, the measurement tip 503 (the stylus 502) is moved considerably, and the measurement tip 503 (or the stylus 502) can interfere with the workpiece.

In contrast, when the present invention is applied, it is possible to change the posture of the probe head 500 without moving the measurement tip 503. Thus, it is possible to avoid unintentional interference of the measurement tip 503 (or the stylus 502) with the workpiece.

The feature of the present invention is that a command given as the coordinate values of a measurement tip is converted into the coordinates of the rotation center Q by the conversion expression considering the first rotating angle $\alpha i$ and the second rotating angle $\beta i$ and the coordinates of the rotation center Q is set as the controlling interpolation point Qi.

For example, the operator may set the movement locus of the measurement tip not only to a straight line but also to an arbitrary arc or polygonal curve as needed.

As long as the controlling interpolation point Qi is calculated by the conversion expression considering the first rotating angle $\alpha i$ and the second rotating angle $\beta i$ at that time, and the X, Y, and Z-drive axes are moved to the controlling interpolation point Qi as the positioning target, it is possible for the movement locus of the measurement tip to path through the locus the operator has intended.

The invention claimed is:

1. A method for controlling a shape measuring apparatus, the apparatus measuring a shape of a workpiece and comprising:
   a probe head including a stylus having a measurement tip at a tip end of the stylus, a first drive axis that rotates about a first rotation axis and a second drive axis that rotates about a second rotation axis perpendicular to the first rotation axis, the probe head changing a posture of the stylus by rotational motion of the first drive axis and the second drive axis;
   a coordinate measuring machine including three translation axes of a third drive axis, a fourth drive axis, and a fifth drive axis that are perpendicular to each other, the coordinate measuring machine three-dimensionally changing a location of the probe head;
   wherein a location of the measurement tip is determined by coordinate values (T3, T4, T5) of the third to fifth drive axes, and a posture of the probe head is determined by a first rotating angle $\alpha$ of the first drive axis and a second rotating angle $\beta$ of the second drive axis, the method comprising:
   calculating, for each of the first to fifth drive axes, an interpolation point in each control period in a movement path starting from a current position Hs (Ts3, Ts4, Ts5, $\alpha s$, $\beta s$) to a target position He (Te3, Te4, Te5, $\alpha e$, $\beta e$);
   setting an intersection point between the first rotation axis and the second rotation axis as a rotation center Q, and coordinate values of the rotation center Q into which coordinate values of the interpolation point of the measurement tip are converted by a predetermined conversion expression considering values of the interpolation point ($\alpha i$, $\beta i$) of the first drive axis and the second drive axis as a controlling interpolation point Qi, wherein the predetermined conversion expression determines the controlling point by converting each of the interpolation points, for each of the first to fifth drive axes, from a workpiece coordinate system to a machine coordinate system; and
   controlling locations of the third to fifth drive axes to the controlling interpolation point Qi in each control period, and controlling locations of the first and second drive axes to the interpolation point ($\alpha i$, $\beta i$) of the first and second drive axes.

2. The method for controlling the shape measuring apparatus according to claim 1, further comprising:
   generating speed patterns, of the first to fifth drive axes, each starting from the current position Hs (Ts3, Ts4, Ts5, $\alpha s$, $\beta s$) to the target position He (Te3, Te4, Te5, $\alpha e$, $\beta e$); and
   generating standardized speed patterns of the third to fifth drive axes such that the speed patterns generated for the third to fifth drive axes are synchronized at a common acceleration/deceleration time and in a common necessary time.

3. The method for controlling the shape measuring apparatus according to claim 1, further comprising:
   generating speed patterns, of the first to fifth drive axes, each starting from the current position Hs (Ts3, Ts4, Ts5, $\alpha s$, $\beta s$) to the target position He (Te3, Te4, Te5, $\alpha e$, $\beta e$); and
   generating standardized speed patterns of the first to fifth drive axes such that the speed patterns generated for the first to fifth drive axes are synchronized at a common acceleration/deceleration time and in a common necessary time.

4. The method for controlling a shape measuring apparatus according to claim 1, wherein the movement path starting from the current position Hs to the target position He is set as a substantially straight-line movement path.

5. The method for controlling a shape measuring apparatus according to claim 1, wherein the movement path starting from the current position Hs to the target position He is set as a substantially polygonal curve movement path.

6. The method for controlling a shape measuring apparatus according to claim 1, wherein the movement path starting from the current position Hs to the target position He is set as a substantially arcuate movement path.

7. The method for controlling a shape measuring apparatus according to claim 1, wherein an extension of the first rotation axis, an extension of the second rotation axis, and an extension of the third rotation axis intersect at the intersection point.

8. A method for controlling a shape measuring apparatus, the apparatus measuring a shape of a workpiece and comprising:
   a probe head including a stylus having a measurement tip at a tip end of the stylus, a first drive axis that rotates about a first rotation axis and a second drive axis that rotates about a second rotation axis perpendicular to the first rotation axis, the probe head changing a posture of the stylus by rotational motion of the first drive axis and the second drive axis;
   a coordinate measuring machine including three translation axes of a third drive axis, a fourth drive axis, and a fifth drive axis that are perpendicular to each other, the coordinate measuring machine three-dimensionally changing a location of the probe head;

wherein a location of the measurement tip is determined by coordinate values (T3, T4, T5) of the third to fifth drive axes, and a posture of the probe head is determined by a first rotating angle α of the first drive axis and a second rotating angle β of the second drive axis, the method comprising:

setting, by an operator, a movement path starting from a current position Hs (Ts3, Ts4, Ts5, αs, βs) to a target position He (Te3, Te4, Te5, αe, βe);

calculating, for each of the first to fifth drive axes, an interpolation point in each control period in a movement path starting from the current position Hs (Ts3, Ts4, Ts5, αs, βs) to the target position He (Te3, Te4, Te5, αe, βe);

setting an intersection point between the first rotation axis and the second rotation axis as a rotation center Q, and coordinate values of the rotation center Q into which coordinate values of the interpolation point of the measurement tip are converted by a predetermined conversion expression considering values of the interpolation point (αi, βi) of the first drive axis and the second drive axis as a controlling interpolation point Qi, wherein the predetermined conversion expression determines the controlling point by converting each of the interpolation points, for each of the first to fifth drive axes, from a workpiece coordinate system to a chine coordinate system; and controlling locations of the third to fifth drive axes to the controlling interpolation point Qi in each control period and controlling locations of the first and second drive axes to the interpolation point (αi, βi) of the first and second drive axes.

9. The method for controlling the shape measuring apparatus according to claim 8, wherein the movement path starting from the current position Hs (Ts3, Ts4, Ts5, αs, βs) to the target position He (Te3, Te4, Te5, αe, βe) is set as a substantially straight-line movement path.

10. The method for controlling the shape measuring apparatus according to claim 8, wherein the movement path starting from the current position Hs (Ts3, Ts4, Ts5, αs, βs) to the target position He (Te3, Te4, Te5, αe, βe) is set as a substantially polygonal curve movement path.

11. The method for controlling the shape measuring apparatus according to claim 8, wherein the movement path starting from the current position Hs (Ts3, Ts4, Ts5, αs, βs) to the target position He (Te3, Te4, Te5, αe, βe) is set as a substantially arcuate movement path.

12. The method for controlling a shape measuring apparatus according to claim 8, wherein an extension of the first rotation axis, an extension of the second rotation axis and an extension of the third rotation axis intersect at the intersection point.

* * * * *